United States Patent
Sakagawa et al.

(10) Patent No.: US 6,825,837 B1
(45) Date of Patent: Nov. 30, 2004

(54) SPACE RENDERING METHOD, VIRTUAL SPACE RENDERING APPARATUS, CACHE DEVICE, AND STORAGE MEDIUM

(75) Inventors: Yukio Sakagawa, Tokyo (JP); Akihiro Katayama, Yokosuka (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 09/642,091

(22) Filed: Aug. 21, 2000

(30) Foreign Application Priority Data

Sep. 2, 1999 (JP) ............................................. 11-249292
Sep. 2, 1999 (JP) ............................................. 11-249294

(51) Int. Cl.⁷ .............................................. G06T 15/00
(52) U.S. Cl. ...................................................... 345/419
(58) Field of Search ................................ 345/419, 427, 345/619, 625, 628

(56) References Cited

U.S. PATENT DOCUMENTS

| | | | | |
|---|---|---|---|---|
| 6,054,991 A | * | 4/2000 | Crane et al. ................. | 345/420 |
| 6,058,397 A | * | 5/2000 | Barrus et al. ................. | 707/104 |
| 6,111,566 A | | 8/2000 | Chiba et al. ................. | 345/202 |
| 6,229,546 B1 | * | 5/2001 | Lancaster et al. ............ | 345/419 |
| 6,401,237 B1 | * | 6/2002 | Ishikawa ...................... | 717/113 |
| 6,466,239 B2 | * | 10/2002 | Ishikawa ...................... | 345/850 |
| 6,498,983 B2 | * | 12/2002 | Hashida ........................ | 701/207 |

FOREIGN PATENT DOCUMENTS

JP      10-222699      8/1998
JP      10-312471      11/1998

* cited by examiner

Primary Examiner—Phu K. Nguyen
(74) Attorney, Agent, or Firm—Fitzpatrick, Cella Harper & Scinto

(57) ABSTRACT

In a space rendering method for rendering a virtual space, ray space data of virtual objects in the virtual space are stored in an external database (29). When space data of a virtual object located within a predetermined range from the indicated position is not present in an internal memory (27), the space data is downloaded from the database (29) to the internal memory (27), and the virtual space is rendered on the basis of the downloaded space data.

21 Claims, 36 Drawing Sheets

FIG. 12

| ZONE | ON MAIN MEMORY | |
|---|---|---|
| | RAY SPACE DATA | BILLBOARD IMAGE DATA |
| A | PRESENT/ABSENT | PRESENT/ABSENT |
| B | PRESENT/ABSENT | PRESENT/ABSENT |
| C | PRESENT/ABSENT | PRESENT/ABSENT |
| D | PRESENT/ABSENT | PRESENT/ABSENT |

FIG. 17

ZONE INFORMATION TABLE

| ZONE | ZONE ATTRIBUTE | VALUE | REQUIRED IMAGE ID (RQD-ID) | EXTERNAL DEMAND IMAGE ID (EXT-DMND-ID) | INTERNAL DEMAND IMAGE ID (INT-DMND-ID) |
|---|---|---|---|---|---|
| A | DISPLAY TARGET ZONE | 0 | A | nul | nul |
| B | DISPLAY TARGET ZONE | 0 | B | nul | nul |
| C | DISPLAY TARGET ZONE | 0 | C | nul | nul |
| D | DISPLAY TARGET ZONE | 0 | D | nul | nul |
| $T_{BA}$ | TRANSITION ZONE | 1 | nul | A | B |
| $T_{AB}$ | TRANSITION ZONE | 1 | nul | B | A |
| $T_{AC}$ | TRANSITION ZONE | 1 | nul | C | A |
| $T_{BD}$ | TRANSITION ZONE | 1 | nul | D | B |
| $T_{BC}$ | TRANSITION ZONE | 1 | nul | C | B |
| $T_{AD}$ | TRANSITION ZONE | 1 | nul | D | A |
| $T_{AE}$ | TRANSITION ZONE | 1 | nul | E | A |
| X | INTERMEDIATE ZONE | 2 | nul | nul | nul |

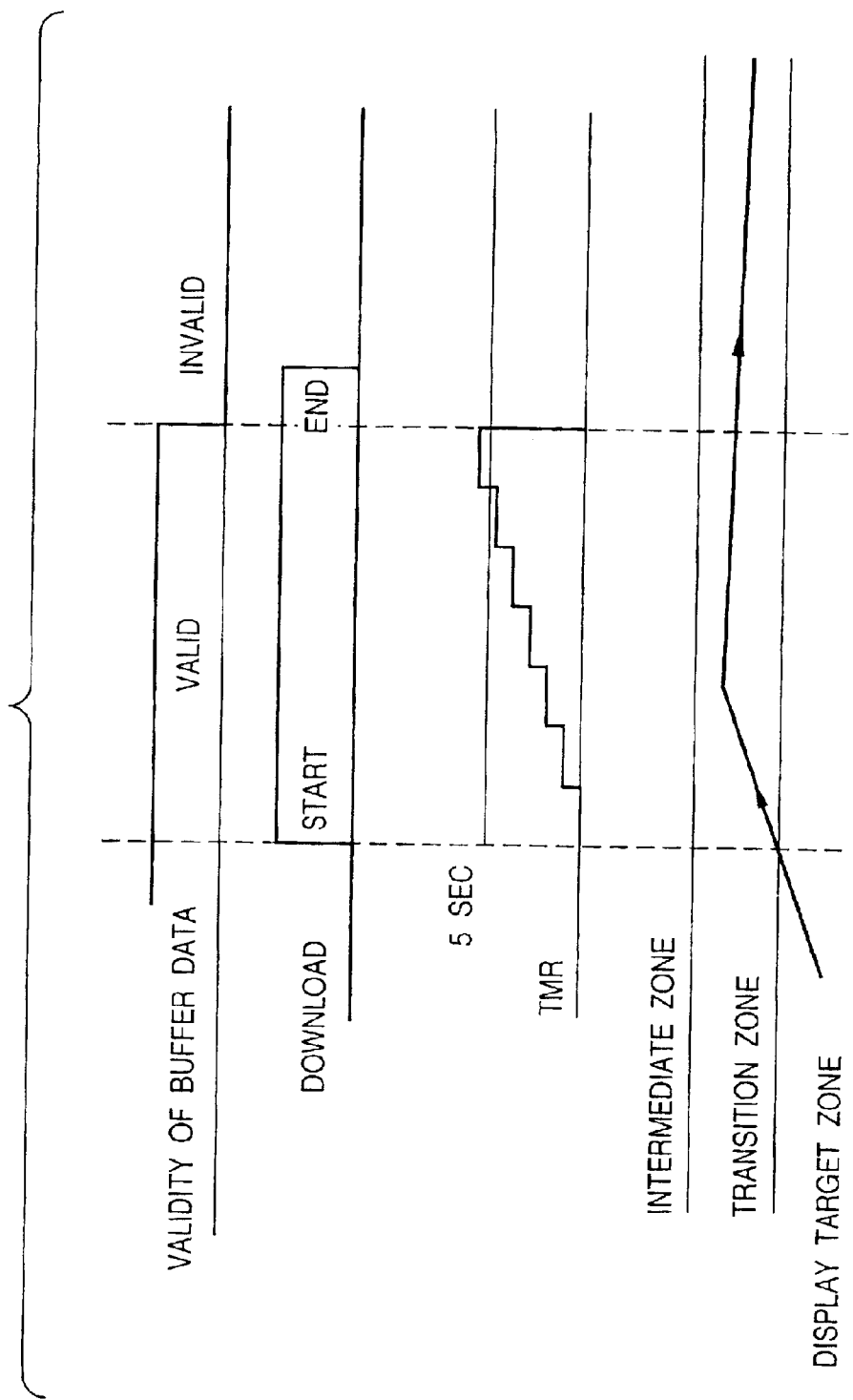

FIG. 23

| | REGISTER | VALUE | MEANING |
|---|---|---|---|
| STATE OF BANK | $F_{B1}$ | 0 | DATA IN BANK 1 IS INVALID |
| | | 1 | DATA IN BANK 1 IS VALID |
| | | 2 | DATA IN BANK 1 IS GRAY |
| | | 3 | DOWNLOADING OF BANK 1 IS UNDERWAY |
| | $F_{B2}$ | 0 | DATA IN BANK 2 IS INVALID |
| | | 1 | DATA IN BANK 2 IS VALID |
| | | 2 | DATA IN BANK 2 IS GRAY |
| | | 3 | DOWNLOADING OF BANK 2 IS UNDERWAY |
| STORED IMAGE | $ID_{B1}$ | A | IMAGE DATA ID IN BANK 1 IS A |
| | | B | IMAGE DATA ID IN BANK 1 IS B |
| | | C | IMAGE DATA ID IN BANK 1 IS C |
| | | D | IMAGE DATA ID IN BANK 1 IS D |
| | $ID_{B2}$ | 0 | IMAGE DATA ID IN BANK 2 IS A |
| | | 1 | IMAGE DATA ID IN BANK 2 IS B |
| | | 2 | IMAGE DATA ID IN BANK 2 IS C |
| | | 3 | IMAGE DATA ID IN BANK 2 IS D |

FIG. 24

| | REGISTER | VALUE | MEANING |
|---|---|---|---|
| STORAGE LOCATION OF IMAGE | $B_A$ | 0 | NOT STORED |
| | | 1 | IMAGE A OF DISPLAY TARGET ZONE A IS STORED IN BANK 1 |
| | | 2 | IMAGE A OF DISPLAY TARGET ZONE A IS STORED IN BANK 2 |
| | $B_B$ | 0 | NOT STORED |
| | | 1 | IMAGE B OF DISPLAY TARGET ZONE B IS STORED IN BANK 1 |
| | | 2 | IMAGE B OF DISPLAY TARGET ZONE B IS STORED IN BANK 2 |
| | $B_C$ | 0 | NOT STORED |
| | | 1 | IMAGE C OF DISPLAY TARGET ZONE C IS STORED IN BANK 1 |
| | | 2 | IMAGE C OF DISPLAY TARGET ZONE C IS STORED IN BANK 2 |
| | $B_D$ | 0 | NOT STORED |
| | | 1 | IMAGE D OF DISPLAY TARGET ZONE B IS STORED IN BANK 1 |
| | | 2 | IMAGE D OF DISPLAY TARGET ZONE B IS STORED IN BANK 2 |
| | $B_E$ | 0 | NOT STORED |
| | | 1 | IMAGE E OF DISPLAY TARGET ZONE A IS STORED IN BANK 1 |
| | | 2 | IMAGE E OF DISPLAY TARGET ZONE A IS STORED IN BANK 2 |

FIG. 25

| | REGISTER | VALUE | MEANING |
|---|---|---|---|
| LOCATION OF VIEWPOINT POSITION | PR-Z | A | DISPLAY TARGET ZONE USER STAYED PREVIOUSLY IS A |
| | | B | DISPLAY TARGET ZONE USER STAYED PREVIOUSLY IS B |
| | | C | DISPLAY TARGET ZONE USER STAYED PREVIOUSLY IS C |
| | | D | DISPLAY TARGET ZONE USER STAYED PREVIOUSLY IS D |
| | CR-Z | A | DISPLAY TARGET ZONE USER STAYS CURRENTLY IS A |
| | | B | DISPLAY TARGET ZONE USER STAYS CURRENTLY IS B |
| | | C | DISPLAY TARGET ZONE USER STAYS CURRENTLY IS C |
| | | D | DISPLAY TARGET ZONE USER STAYS CURRENTLY IS D |

F I G. 26

| REGISTER | VALUE | MEANING |
|---|---|---|
| COM | 0 | IDLE STATE |
| | 1 | DOWNLOADING IN PROGRESS |
| TMR | A | ZONE TRANSITION MONITOR TIMER |

SPACE RENDERING METHOD, VIRTUAL SPACE RENDERING APPARATUS, CACHE DEVICE, AND STORAGE MEDIUM

FIELD OF THE INVENTION

The present invention relates to a space rendering method for presenting a virtual space to the user while downloading and decoding large-size compressed image data such as ray space data, a virtual space rendering apparatus, a cache device, and a storage medium.

BACKGROUND OF THE INVENTION

Many schemes that describe and express a virtual space on the basis of actually sensed images in place of a description based on three-dimensional geometric models have been proposed. Such schemes are called Image Based Rendering (to be abbreviated as IBR hereinafter), and are characterized in that they can express a virtual space with high reality, which cannot be obtained by a scheme based on three-dimensional geometric models. Attempts to describe a virtual space on the basis of a ray space theory as one of IBR schemes have been proposed. See, for example, "Implementation of Virtual Environment by Mixing CG model and Ray Space Data", IEICE Journal D-11, Vol. J80-D-11 No. 11, pp. 3048–3057, November 1997, or "Mutual Conversion between Hologram and Ray Space Aiming at 3D Integrated Image Communication", 3D Image Conference, and the like.

The ray space theory will be explained below. As shown in FIG. 1, a coordinate system 0-X-Y-Z is defined in a real space. A light ray that passes through a reference plane P (Z=z) perpendicular to the Z-axis is defined by a position (x, y) where the light ray crosses P, and variables $\theta$ and $\phi$ that indicate the direction of the light ray. More specifically, a single light ray is uniquely defined by five variables (x, y, z, $\theta$, $\phi$). If a function that represents the light intensity of this light ray is defined as f, light ray group data in this space can be expressed by $f(x, y, z, \theta, \phi)$. This five-dimensional space is called a "ray space". Generally, a time variation t is also used in some cases, but is omitted here. If the reference plane P is set at z=0, and disparity information of a light ray in the vertical direction, i.e., the degree of freedom in the $\phi$ direction is omitted, the degree of freedom of the light ray care be regenerated to two dimensions (x, $\theta$). This x-$\theta$ two-dimensional space is a partial space of the ray space. As shown in FIG. 3, if u=tan$\theta$, a light ray (FIG. 2) which passes through a point (X, Z) in the real space is mapped onto a line in the x-u space, said line is given by:

$$X = x + u \cdot Z \quad (1)$$

Image sensing by a camera reduces to receiving light rays that pass through the lens focal point of the camera by an image sensing surface, and converting their brightness levels and colors into an image. In other words, a light ray group which passes through one point,. i.e., the focal point position, in the real space is captured as an image in correspondence with the number of pixels. In this, since the degree of freedom in the $\phi$ direction is omitted, and the behavior of a light ray is examined in only the X-Z plane, only pixels on a line segment that intersects a plane orthogonal with respect to the Y-axis need to be considered. In this manner, by sensing an image, light rays that pass through one point can be collected, and data on a single line segment in the x-u space can be captured by a single image sensing.

When this image sensing is done a large number of times by changing the viewpoint position (in this specification, the viewpoint position includes both the position of the viewpoint and the line-of-sight direction unless otherwise specified), light ray groups which pass through a large number of points can be captured. When the real space is sensed using N cameras, as shown in FIG. 4, data on a line given by:

$$X_n = x + u \cdot Z_n \quad (2)$$

can be input in correspondence with a focal point position $(X_n, Z_n)$ of the n-th camera (n=1, 2, ..., N) as shown in FIG. 5. In this way, when an image is sensed from a sufficiently large number of viewpoints, the x-u space can be densely filled with data.

Conversely, an observation image from a new arbitrary viewpoint position can be generated (FIG. 7) from the data of the x-u space (FIG. 6). As shown in FIG. 7, an observation image from a new viewpoint position E(X, Z) indicated by an eye mark can be generated by reading out data on a line given by equation (1) from the x-u space.

Actually sensed image data like the aforementioned ray space data is compressed and stored in an external storage device or the like for each unit (e.g., for each object). Therefore, in order to render such space data in a virtual space, the data must be downloaded onto a main storage device, decoded, and rendered on the main storage device. On the other hand, the user can recognize a given virtual space only after virtual images of all virtual objects to be rendered in that virtual space are displayed. Therefore, when there are a plurality of objects to be rendered, the user cannot recognize such virtual objects until space data of all these objects are downloaded, decoded, and rendered. That is, when the user wants to walk through such virtual space, a rendering apparatus with poor response results due to excessive processing requirement.

This is the first problem of the prior art upon handling space data such as ray space data.

The second problem of the prior art results from the fact that actually sensed image data such as ray space data or the like contain a large volume of data. It is a common practice to store such data at a location separated from an image processing apparatus in the form of a database. For this reason, when the image processing apparatus maps a virtual image in a virtual space, a large volume of space data must be downloaded into the image processing apparatus, in advance. Owing to the huge size of actually sensed image data, the turn around time from when space data is requested until that space data is ready to be rendered in the image processing time is not so short, although the communication speed has improved recently. Under these circumstances, the user must be prevented from being bored during the wait time until actually sensed image data is ready for use in such system that presents a virtual space. That is, during this wait time a billboard image (a single image) with a short download time is displayed instead, although a scene from an arbitrary viewpoint position cannot be obtained.

The third problem of the prior art occurs when a walk-through system which allows the user to freely walk through a virtual space using actually sensed image data such as ray space data has a limited memory size. That is, in order to combat the aforementioned first problem, a technique for segmenting a virtual space into a plurality of subspaces (e.g., in case of a virtual art museum, each exhibition room forms one subspace) can be proposed.

More specifically, when it is detected that the user is about to approach a given exhibition room, only space data of that exhibition room is pre-fetched to shorten the time required for transfer prior to rendering. Furthermore, when the user is about to leave that exhibition room (subspace A), space data for the next subspace (e.g., exhibition room B) must be overwritten and stored on the memory area that stored space data of the previous exhibition room(subspace A). In this manner, virtual subspaces of exhibition rooms can be reproduced in turn in nearly real time even by a relatively small memory size.

This pre-fetch start timing is determined depending on whether or not the viewpoint position of the user approaches a target subspace. However, since the user's viewpoint position moves using a mouse or the like without any high-precision route guide, the user may often be guided to a wrong route. That is, when it is erroneously detected that the user's viewpoint position which does not reach a pre-fetch start zone has reached that zone, the system starts pre-fetch. Especially, when the user's viewpoint position moves near the pre-fetch start zone, such operation error readily occurs. For example, as shown in FIG. 8, when the viewpoint position moves from the exhibition room space into the pre-fetch start zone and returns to the exhibition room space again, if the aforementioned wrong pre-fetch starts, large-size space data for the exhibition room space is purged (deleted), and the system must re-transfer the data of the exhibition room space to "return" to the exhibition room space (since this situation takes place due to a detection error of the viewpoint position, the user has no actual sense of returning), resulting in time-consuming operation.

The present invention is directed to the first and third problems. That is, the first object of the present invention against the first problem is to provide a space rendering method and rendering apparatus, which can implement space rendering with high real-time response when large-size space data stored in a memory such as an external storage device or the like is temporarily downloaded, and a virtual space is rendered on the basis of the downloaded space data.

Also, the second object of the present invention against the first problem is to provide a space rendering method and rendering apparatus, which can implement space rendering with high real-time response, when encoded space data is temporarily decoded to render a virtual space.

The object of the present invention against the third problem, is to provide a space rendering method, apparatus, and cache device, which are free from any wasteful re-transfer of the space data.

SUMMARY OF THE INVENTION

In order to achieve the first object of the present invention against the first problem, according to one aspect of the present invention, a space rendering method for rendering a virtual space, comprises the steps of:

storing space data in a first format of a virtual object in the virtual space in a first memory;

downloading space data of a virtual object located within a predetermined range from an arbitrary position in the virtual space from the first memory to a second memory when that space data is not present in the second memory; and rendering the virtual space on the basis of the downloaded space data in the second memory.

According to this aspect, the space data to be downloaded is limited to that near an arbitrary position, thus maintaining high real-time response.

However, even when the space data to be downloaded is limited to that near an arbitrary position as in this aspect, a certain download time is required. Target space data cannot be rendered before downloading ends. Hence, according to the method of another aspect, space data of a virtual object in the virtual space is pre-stored as space data in a second format different from the first format in the second memory, and while the space data in the first format is being downloaded from the first memory to the second memory, a virtual space is rendered on the basis of the space data in the second format in the second memory. That is, during downloading, the space data of the second format is used as a substitute image.

If the space data of the second format has a large size, the required memory size increases unnecessarily. Hence, according to the method of claim 3, the space data in the first format is space data based on an actually sensed image, and the space data in the second format is billboard image data.

It is not economical to hold the downloaded space data after it becomes unnecessary. Hence, according to the method of yet another aspect of the present invention, when the current position is separated, not less than a predetermined distance, from the position corresponding to the space data already stored in the second memory, the stored space data is released from the second memory.

According to a preferred aspect of the present invention, the first memory is an external memory, and the second memory is a main memory.

Even billboard image data requires a certain memory size. Hence, according to another aspect, the billboard image data is pre-stored in the first memory, and prior to rendering of the virtual space, the billboard image data in the first memory is downloaded in advance to the second memory.

According to another preferred aspect of the present invention, a virtual walk-through environment is provided to a user in the virtual space.

According to a further preferred aspect of the present invention, the predetermined range indicates a virtual object located within a predetermined distance range from the indicated position. Since the line-of-sight direction is not in question, the probability that the downloaded space data is truly required space data increases.

It is preferable to segment a virtual space into predetermined units, since the required memory size can be reduced. Hence, in one aspect, the virtual object located within the predetermined range from the indicated position includes a virtual object in a virtual subspace located within the predetermined range from the indicated position.

In order to achieve the second object of the present invention against the first problem, a space rendering method for rendering a virtual space, comprises the steps of:

compressing and storing space data in a first format of a virtual object in the virtual space in an internal memory;

decoding a compressed space data of a virtual object located within a predetermined range from an arbitrary position in the virtual space when no decoded space data is present; and rendering the virtual space on the basis of the decoded space data.

The first and second objects can also be achieved by an apparatus to which the above-described methods are applied, and a storage medium of said computer program.

On the other hand, in order to achieve the object of the present invention against the third problem, a space rendering method for rendering a virtual space, comprises the steps of:

storing space data of a plurality of virtual spaces in a first memory;

rendering a first virtual space at an arbitrary indicated position, which belongs to a first zone, on the basis of first space data, which has been downloaded from the first memory to a second memory different from the first memory; and holding the first space data in the second memory and downloading space data of a second zone from the first memory to the second memory when the indicated position has moved into the second zone outside the first zone.

According to this aspect, the indicated position which is located within the second zone outside the first zone means that the indicated position may return to the first zone (first virtual space). However, since the first space data is held in the second memory, even when the indicated position returns to the first zone, the first space data need not be re-downloaded. When the indicated position has returned from the second zone to the first zone, in one aspect the first space data held in the second memory is used as a basis of rendering of the virtual space.

In order to effectively use the second memory, when it is obvious that the first space data is unnecessary, invalidating the first space data is preferable. Hence, according to another aspect, when the indicated position has moved from the first zone to the second zone, and has then moved into a third zone outside the second zone, the first space data held in the second memory is released.

It is preferable to release space data not only in response to user operation but also automatically, since the operability then improves. Hence, according to another preferred aspect of the present invention, when the indicated position has moved from the first zone to the second zone, and then stays in the second zone, a measurement of a staying time in the second zone is started, thus preparing for automatic release. When the indicated position has moved from the first zone to the second zone, and then stays in the second zone for a first time duration, the first space data held in the second memory can be released.

It is also preferable to allow the user to arbitrarily set an automatic release time. Hence, when the indicated position has moved from the first zone to the second zone, and a user makes predetermined instruction operation while the indicated position stays in the second zone, the first space data held in the second memory can be released.

According to a further preferred aspect of the present invention, the third zone bounds both the second zone of the first virtual space and a second zone for the second virtual space. For example, in a walk-through environment in which the user can walk through across a plurality of virtual spaces, it is preferable that a zone which is not strongly linked to any virtual space be present, so as to prevent unwanted downloading or memory release from frequently occurring.

In actual operation, the indicated position may repetitively enter and leave the first and second zones. In such case, repetition of downloading of the second space data is reduced to prevent wasteful downloading of the second space data.

According to still another preferred aspect of the present invention, when the indicated position enters the second zone of the first virtual space from the third zone, it is confirmed if the first space data is already held in the second memory. The geometric nature of the second zone as a transition zone of the indicated position among a plurality of virtual spaces can be effectively used.

The object of the present invention against the third problem can also be achieved by a program storage medium which stores a computer program that implements a space rendering method described above.

The object of the present invention against the third problem can also be achieved by a space rendering apparatus implementing a method described above.

The object of the present invention can also be achieved by a cache device. That is, a cache device for caching space data in a cache memory to allow a user to walk through across a plurality of virtual space, comprises:

a cache memory for storing first space data of a first virtual space to allow the user to walk through the first virtual space; and cache means for, when the user walks through a peripheral zone of the first virtual space, holding the already stored first space data in said cache memory, and pre-fetching space data of a second virtual space which neighbors the first virtual space from an external memory device into said cache memory.

According to another preferred aspect of the present invention, when the user leaves the peripheral zone, a memory area of the first space data in said cache memory is released.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view for explaining the configuration of a table for managing the downloading states of ray space data and billboard image data in the system of the first embodiment;

FIG. 17 is a table showing attribute information assigned to each zone in the virtual space of the second embodiment;

FIG. 22 is a schematic view for explaining control operations executed when the user's viewpoint position stays in the transition zone of the second embodiment;

FIG. 23 is a table for explaining various registers used in the control sequence of the second embodiment and, especially, a register for managing the memory bank states, and a register for storing the IDs of images stored in the banks;

FIG. 24 is a table for explaining various registers used in the control sequence of the second embodiment and, especially, a register for managing the relationship between ray space data to be rendered in each display target zone and the storage location of that data;

FIG. 25 is a table for explaining various registers used in the control sequence of the second embodiment and, especially, register PR-Z for storing the ID of a display target zone corresponding to the immediately preceding location of the user, and register CR-Z for storing the ID of the current display target zone;

FIG. 26 is a table for explaining register COM and timer TMR used in the control sequence of the second embodiment;

DETAILED DESCRIPTION OF THE PREFERRED EMBODIMENTS

Preferred embodiments of the present invention will now be described in detail in accordance with the accompanying drawings.

An image rendering apparatus and method according to embodiments to which the present invention is applied to a walk-through experience in a virtual space will be described in detail hereinafter with reference to the accompanying drawings. These embodiments to be described below include a walk-through system (where is first embodiment which has a main memory that has a sufficiently large memory size, and stores all data expressed by the ray space theory (ray space data; to be also abbreviated as RSD hereinafter), and an embodiment (second embodiment) which has an internal compact main memory device, and repeats assurance of a memory area, i.e. release of the memory area since the main memory device has a size which is not large enough to store all space data.

<Hardware Arrangement> ... Common to First and Second Embodiments

Figure 9:
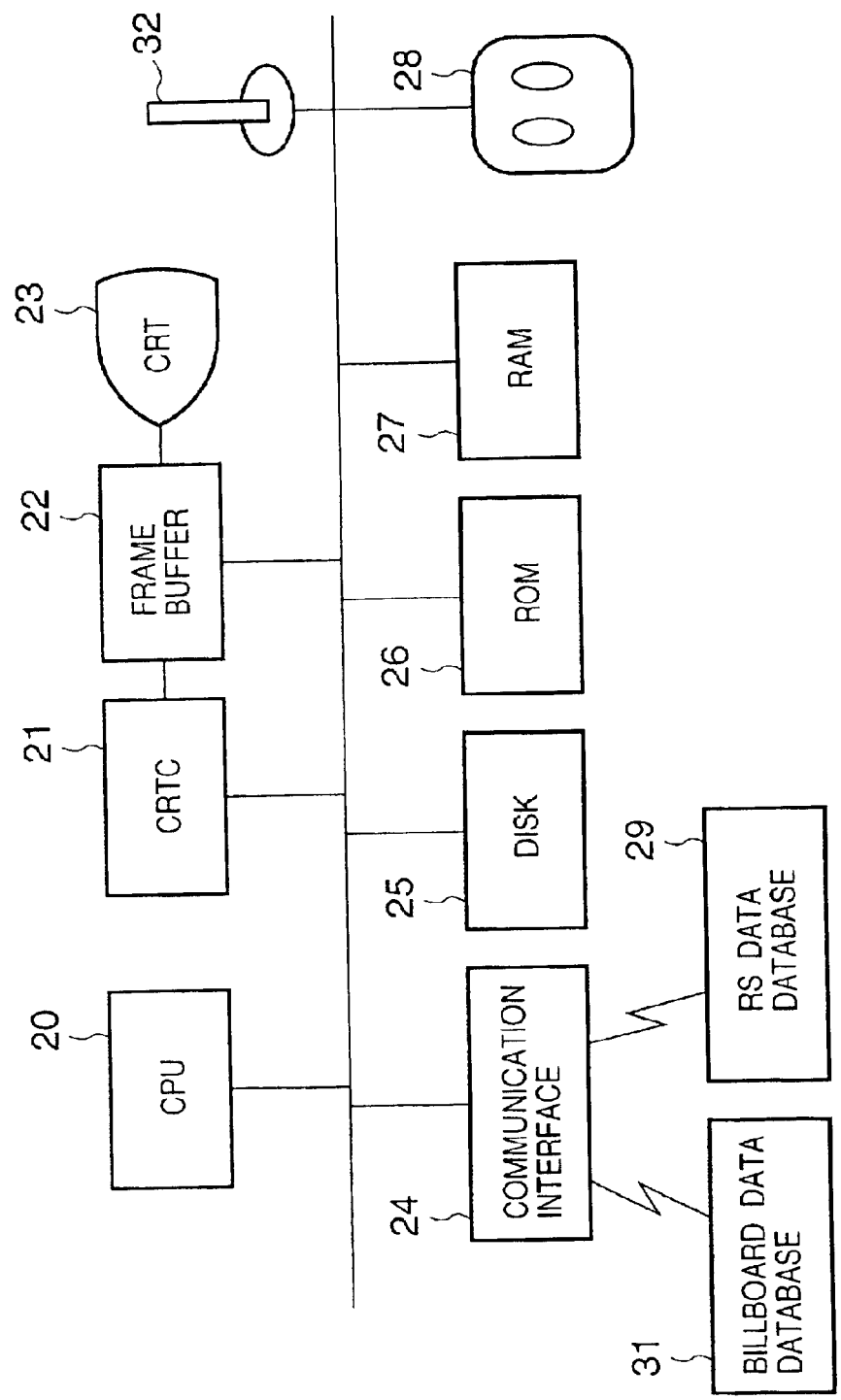
FIG. 9 is a block diagram for explaining the arrangement of a virtual space presentation apparatus (virtual image rendering apparatus) according to the first and second embodiments.

FIG. 9 shows the arrangement of an image processing system of the first and second embodiment. The hardware arrangement shown in FIG. 9 is that of an ordinary workstation. That is, the hardware arrangement itself is the same as that of an ordinary workstation.

Figure 1:
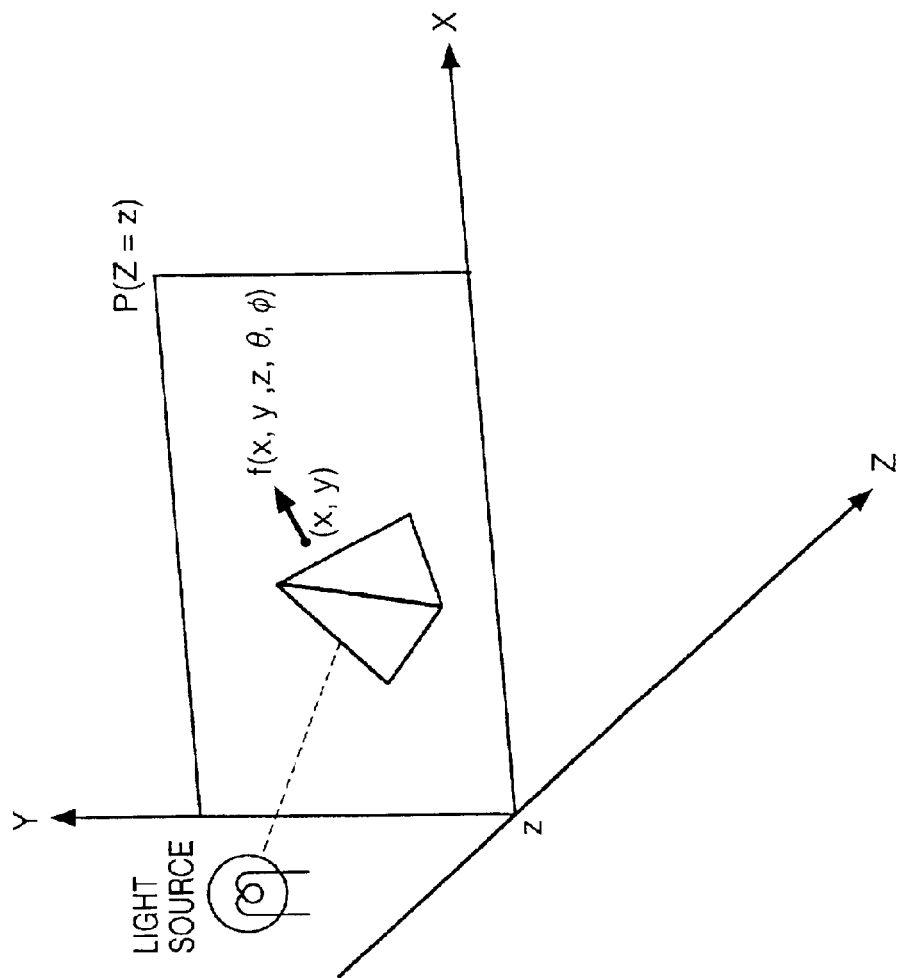
FIG. 1 is a view for explaining the principle for generating ray space data.
Figure 2:
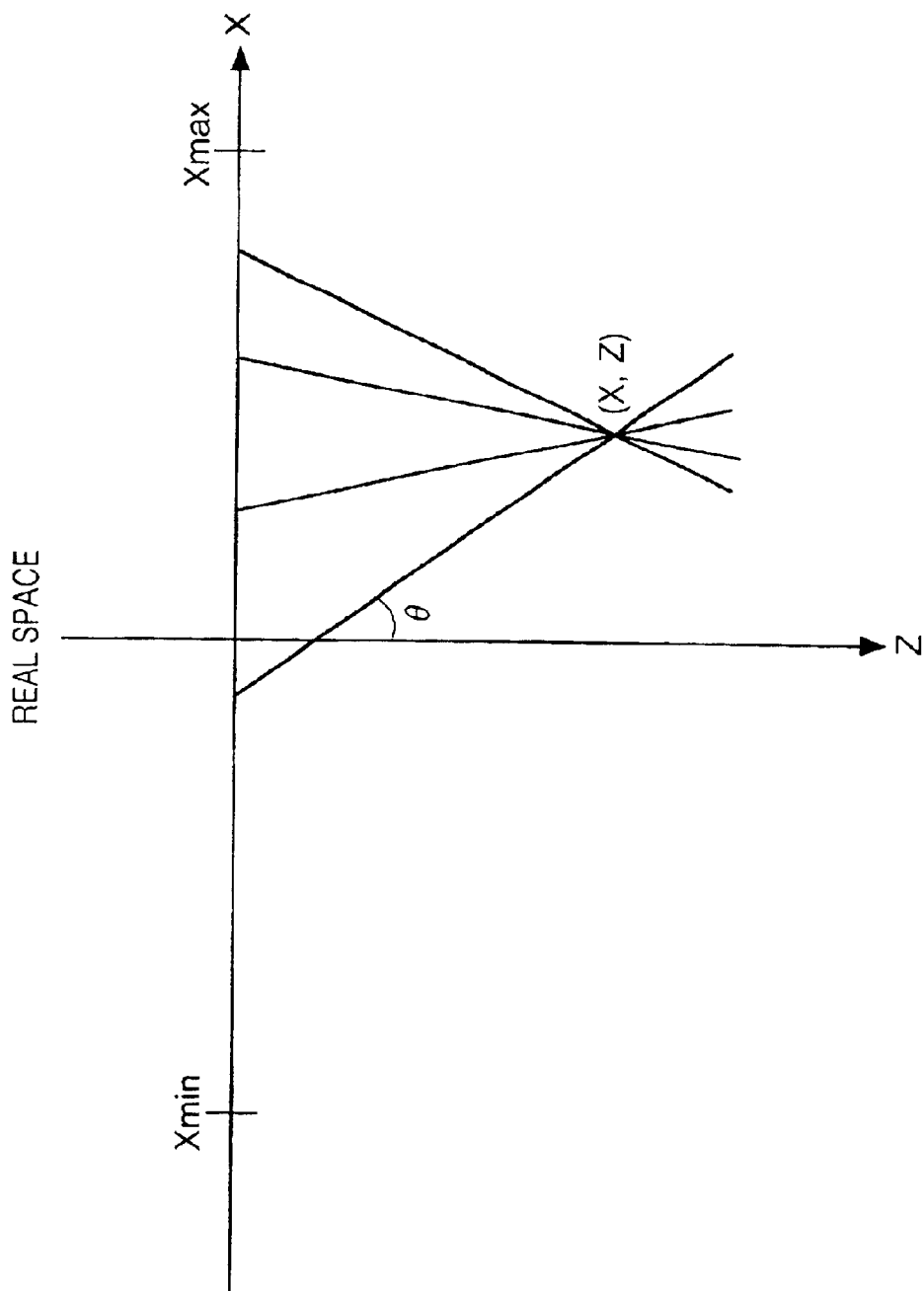
FIG. 2 is a view for explaining data in a real space.
Figure 3:
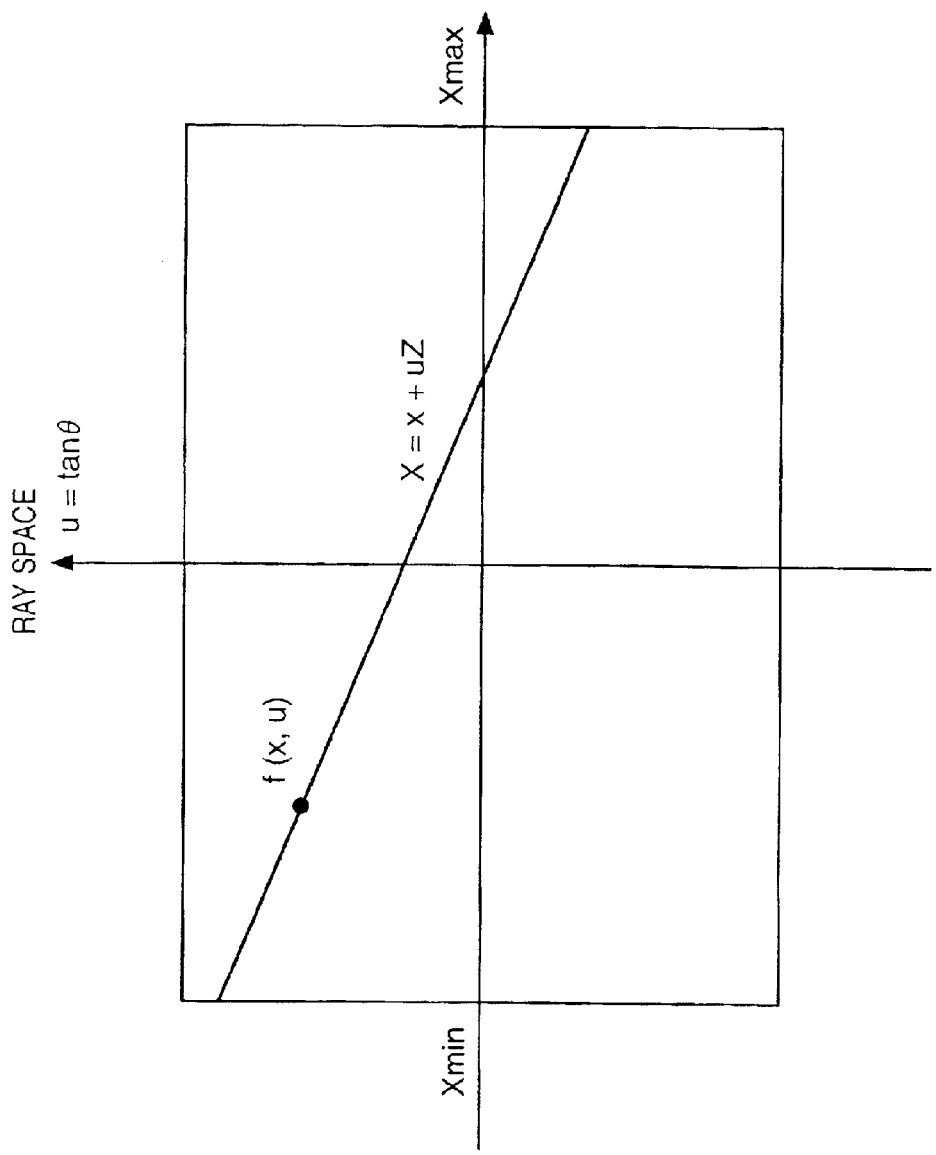
FIG. 3 is a view showing the space shown in FIG. 2, which is expressed by ray space data.
Figure 4:
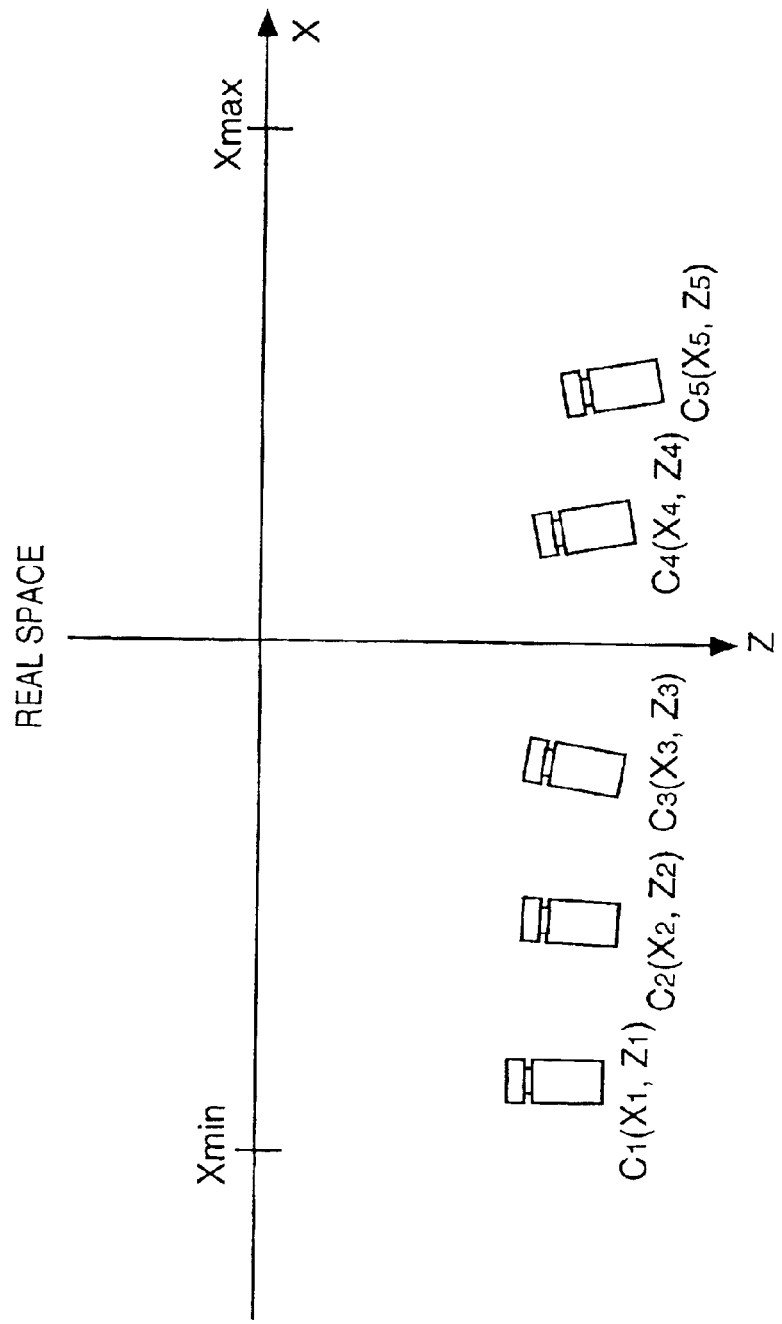
FIG. 4 is a view for explaining the principle of generating real space data when there are a plurality of cameras.
Figure 5:
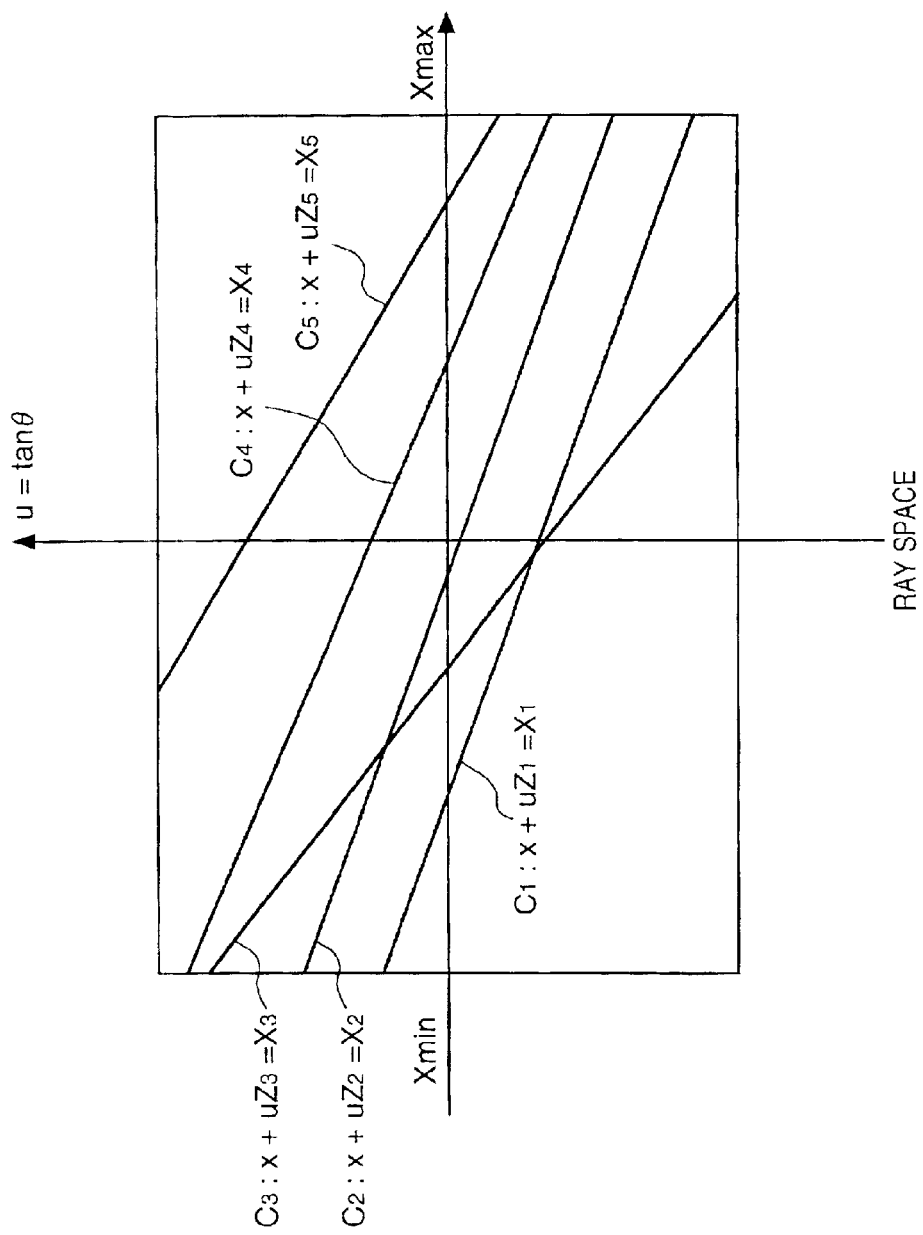
FIG. 5 is a view for explaining the principle of generating ray space data when there are a plurality of cameras.
Figure 6:
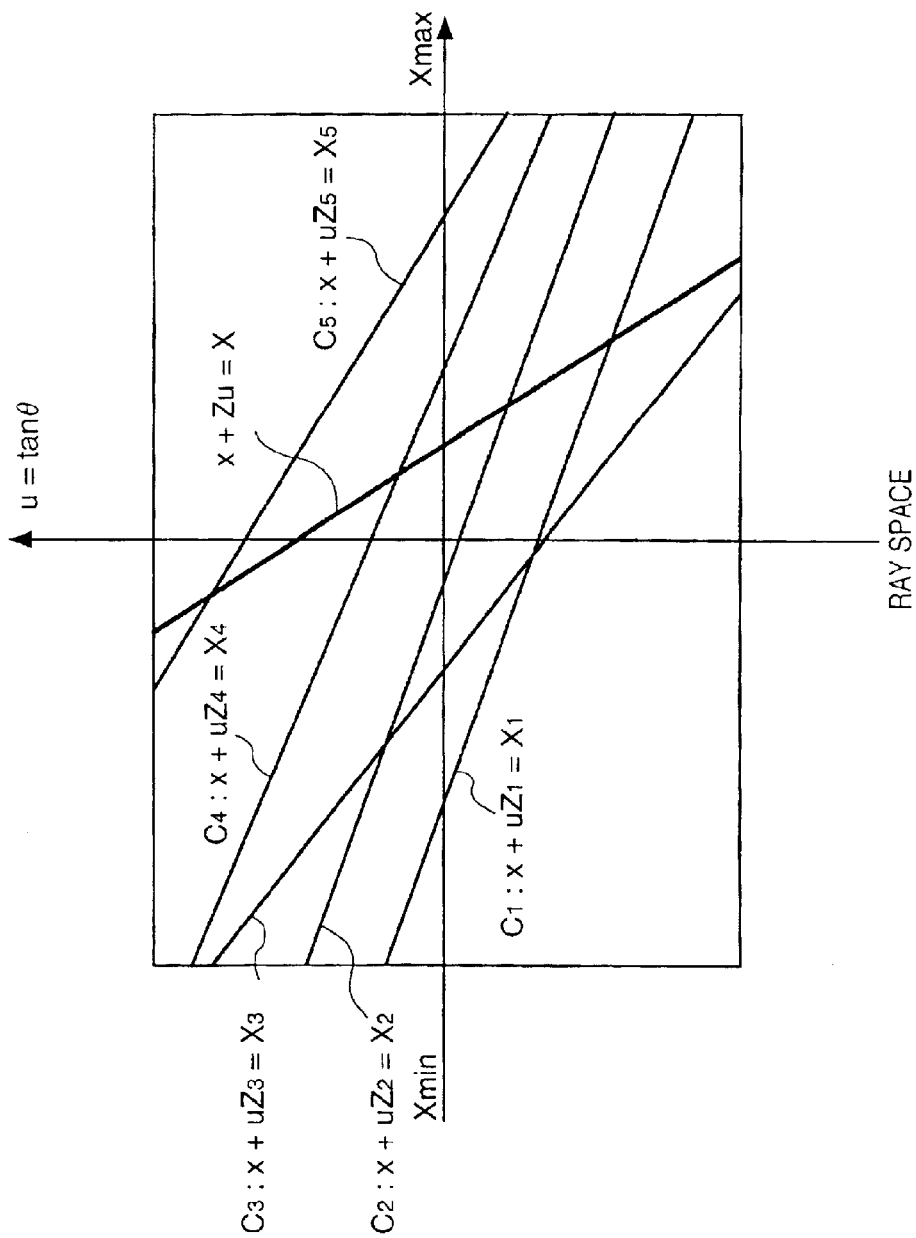
FIG. 6 is a view for explaining the principle of generating ray space data (X=x+Zu) at an arbitrary viewpoint position from ray space data obtained when there are a plurality of cameras.
Figure 7:
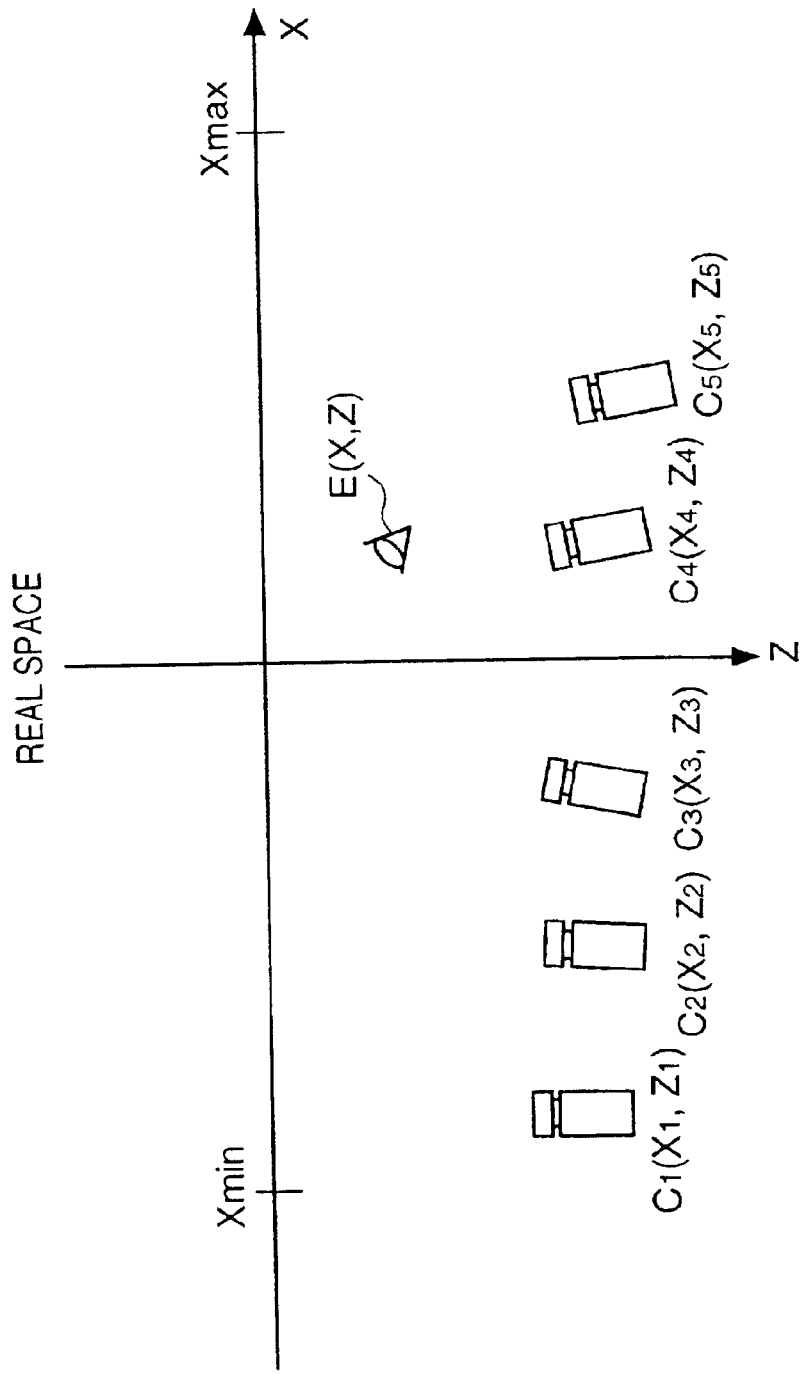
FIG. 7 is a view for explaining the principle of reconstructing a real space from an arbitrary viewpoint shown in FIG. 6.

This system presents a virtual space to the user on a CRT 23. The user can freely walk through that virtual space or can manipulate (move, rotate, enlarge or the like) an object in the virtual space by operating a mouse 28. More specifically, objects in the virtual space are converted into ray space data on the basis of actually sensed images and are stored in advance in a disk 25. When the viewpoint position moves as the user walks through, an image that can be observed at the moved viewpoint position is generated, as has been explained with reference to FIG. 7, and is synthesized with an image generated by rendering conventional CG data based on a geometric model, thus displaying the synthesized image on the CRT 23.

An RSD database 29 has a large-size memory and stores ray space data of all spaces. A billboard image database 31 stores a plurality of billboard images. Note that billboard image data is image data of a given object observed from a certain viewpoint position, and its data size is much smaller than that of ray space data.

As described above, when ray space data cannot be transferred from the database 29 in time, this billboard image is presented to the user instead.

Reference numeral 32 denotes a joystick which instructs to move the user's viewpoint position.

Figure 10:
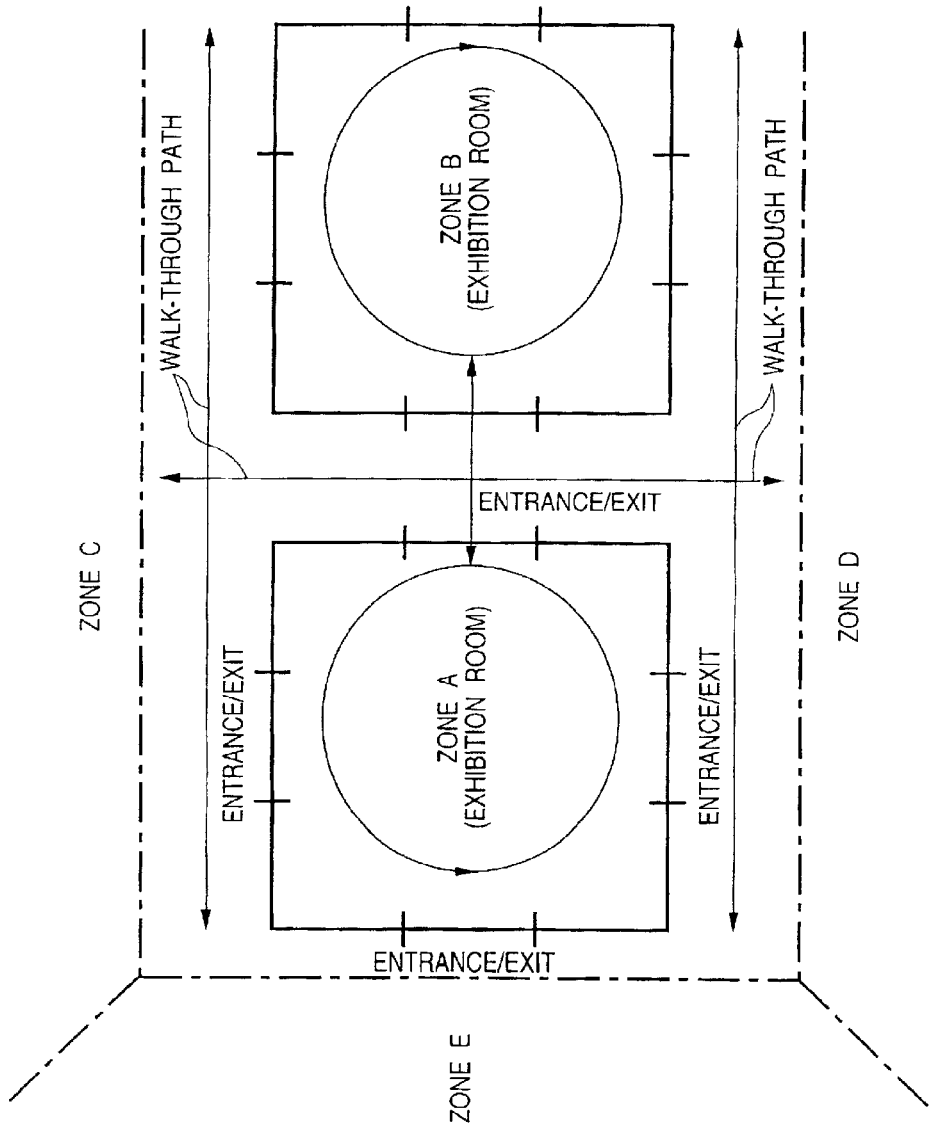
FIG. 10 is a view for explaining the configuration of a virtual space of the first and second embodiments.

FIG. 10 shows a virtual space formed by the first and second embodiments. This virtual space has five zones, i.e., zones A, B, C, D, and E, which are respectively virtual subspaces. FIG. 10 illustrates only zones A and B in detail for the sake of simplicity. The boundaries of the zones (virtual subspaces) are presented to the user as one-dashed chain lines. Moving routes (walk-through routes) of the user's viewpoint position are indicated by thin solid lines. In one zone, "walls" of rectangle shape to represent a virtual exhibition room are indicated by bold solid lines. Each exhibition room has four entrances/exits, and the user can virtually enter/leave each exhibition room through them.

[First Embodiment]

Figure 11:
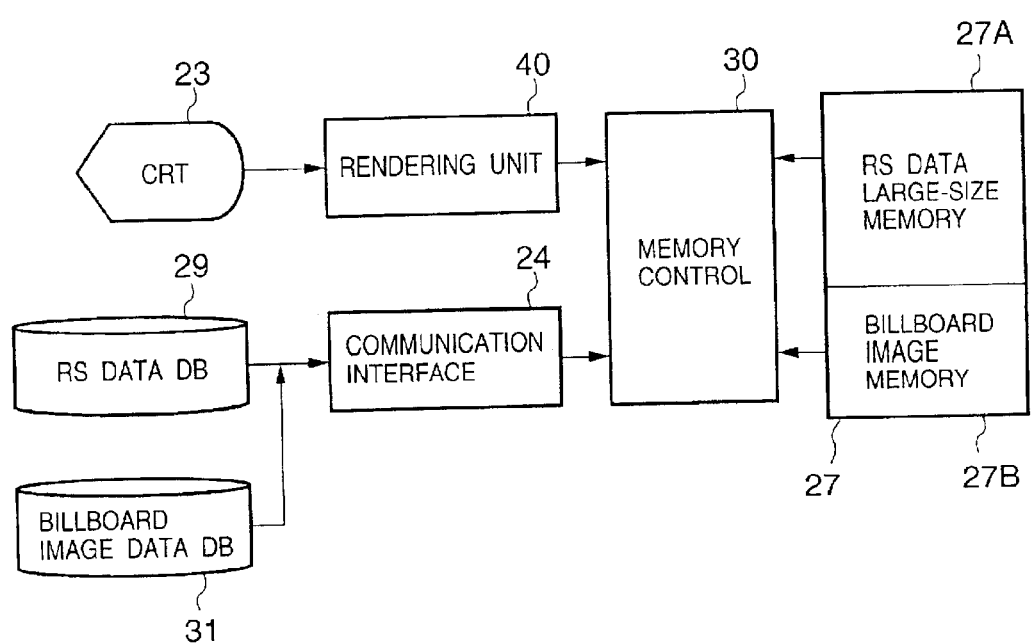
FIG. 11 is a view for explaining the arrangement of principal part of the apparatus of the first embodiment.

FIG. 11 shows the arrangement of an image processing apparatus according to the first embodiment. The characteristic feature of the first embodiment lies in that when ray space data is not ready in time, a billboard is set at a position where a ray space data object is laid out in the virtual space, and an image (billboard image) is pasted onto the billboard and is presented to the user, thus preventing disturbance due to a transfer delay (download lag) of ray space data from the database 29. Since the billboard image has a data size much smaller than that of ray space data and, hence, its transfer time is shorter than that of ray space data.

Referring to FIG. 11, ray space data and billboard image data are stored in the external databases 29 and 31. These databases are transferred into the predetermined areas (27A, 27B) in a main memory 27 via a communication interface (e.g., Ethernet). A rendering unit 40 renders ray space data and billboard image data stored in the main memory on a virtual space under the control of a CPU 20.

In the first embodiment, the CPU 20 saves ray space data read out from the RS data DB (database) 29 on the memory area 27A, and billboard image data on the memory area 27B. Whether or not the data can be saved in the memory is managed in units of zones using a table shown in FIG. 12.

In the first embodiment, ray space data is transferred to the main memory 27 in accordance with three transfer orders, and these three examples will be explained below as first, second, and third examples.

Control Sequence of First Example
First Embodiment

Figure 13:
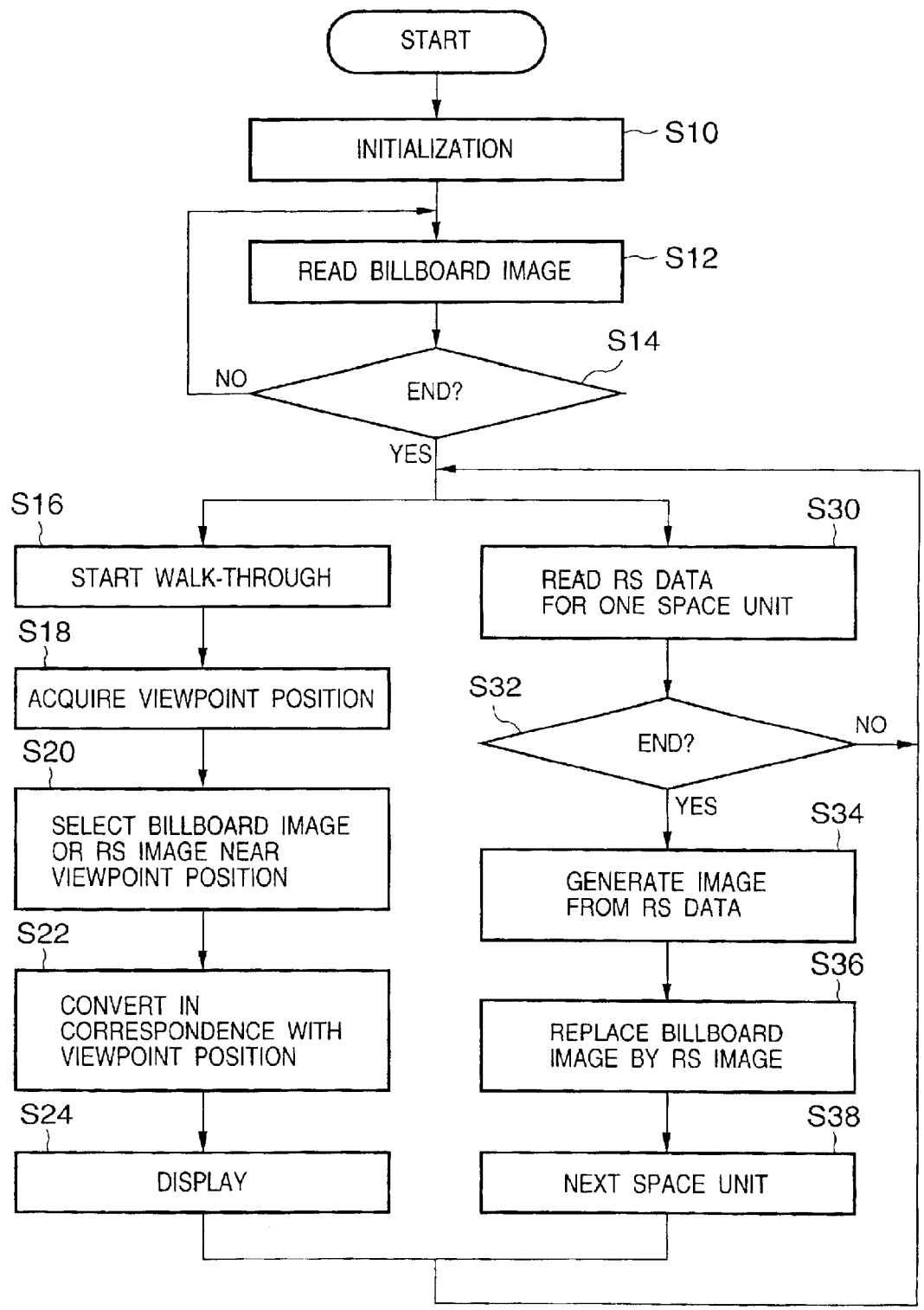
FIG. 13 is a flowchart showing the control sequence according to the first example of the first embodiment.

FIG. 13 is a flowchart showing the control sequence according to the first example. In the first example, all billboard image data are downloaded from the database 31 and are stored in the memory area 27B in steps S10 to S14. After the downloaded image data are decoded, walk-through experience in the virtual space is allowed. The characteristic feature of the first example lies in that presentation of a virtual image to the user to provide walk-through experience (steps S16 to S24) and transfer of ray space data to the memory area 27A (steps S30 to S38) are executed in parallel (but they may be done serially).

More specifically, upon completion of the transfer process (including a decoding process) of billboard images in steps S10 to S14, the "presence" of billboard images for all the zones is marked in the table shown in FIG. 12.

Upon completion of step S14, walk-through is allowed. That is, the viewpoint position designated by the user using the joystick or the like is detected in step S18, and ray space data near the viewpoint position is selected in step S20.

Note that the ray space data near the viewpoint position means space data of virtual objects (including a virtual subspace) which fall within a predetermined distance range with respect to the current viewpoint position on a three-dimensional space. Only distance is in question, and the line-of-sight direction of the user is not in question. This is because the user may approach an object in any direction. The distance can be determined in advance based on the relationship with the size of each exhibition room in the first example.

If ray space data corresponding to that viewpoint position is not present on the memory 27 yet, billboard image data is used instead. That is, a ray space image has priority over a billboard. This is because ray space data can generate a high-resolution virtual image from an arbitrary viewpoint position on the basis of image data from a specific viewpoint position. Therefore, if ray space data is present on the main memory 27, a virtual image is generated in correspondence with the current viewpoint position in step S22, and is presented on the CRT in step S24.

Parallel to rendering and presentation of a virtual space as the user walks through, ray space data is transferred in steps S30 to S38. That is, ray space data for one space unit is transferred in step S30. Note that the space data for one space unit includes a group of space data which pertain to one zone or the like in, e.g., FIG. 10. Upon completion of data transfer for one unit, an image is generated from ray space data in step S34, the presence of the corresponding ray space data on the main memory is marked in step S36, and a transfer request of ray space data for the next one space is sent to the DB 29 in step S38.

Note that only the presence of ray space data is marked, but the corresponding billboard image is not deleted in step S36. However, in order to effectively use the memory, billboard image data which is not used may be deleted from the main memory 27 as long as the corresponding ray space data is present.

In this manner, in the first example of the first embodiment, billboard images are downloaded first to allow walk-through experience in the virtual space and, after that, rendering of virtual images in the virtual space and transfer of ray space data from the database are parallelly done. When ray space data at the viewpoint position in real time is not present on the main memory, a virtual image is rendered based on billboard image data; when required ray space data is present on the main memory, a virtual image is rendered based on that ray space data. As a result, the user can experience walk-through based on at least billboard images early.

Control Sequence of Second Example
First Embodiment

Figure 14:
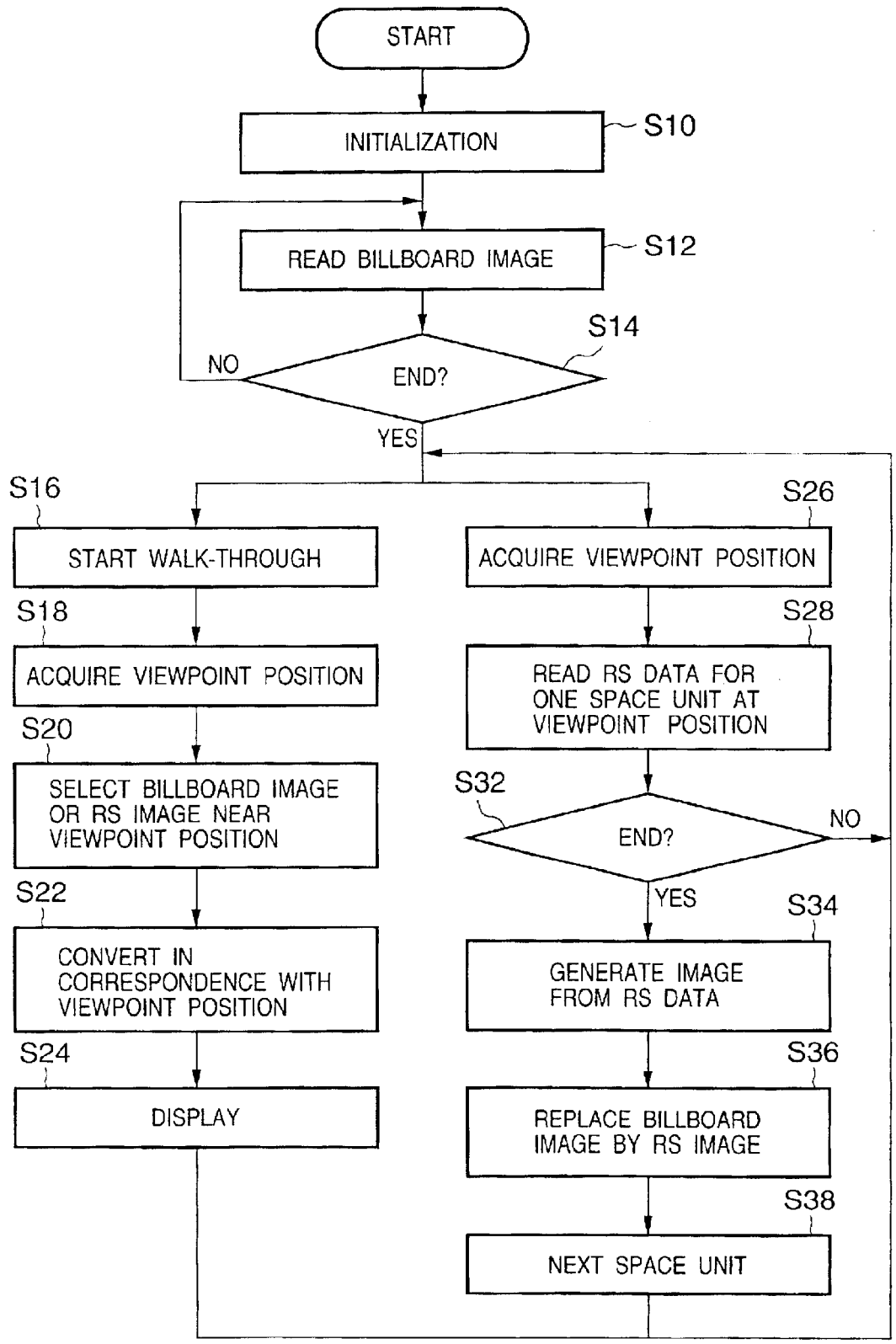
FIG. 14 is a flowchart showing the control sequence according to the second example of the first embodiment.

FIG. 14 shows the control sequence of the second example. In the first example, ray space data is transferred from the DB 29 to the main memory 27A in a predetermined order. However, in the second example, ray space data in a space close to the current viewpoint position of the user is selectively transferred from the database 29. This is because a rendering request of data closer to the user's viewpoint position is more likely to be generated.

The control sequence of FIG. 14 is substantially the same as that in FIG. 13, except that the sequence in FIG. 14 has steps S26 and S28. That is, the current viewpoint position of the user is acquired in step S26, and ray space data for one space unit close to that position is transferred in step S28. Other steps are the same as those in the first example.

In this example, ray space data of a space close to the user's viewpoint position is selected and loaded. Alternatively, ray space data may be loaded in the order from that of an object closest to the viewpoint position in one space.

Third Example
First Embodiment

In the second example, ray space data is decoded immediately after that ray space data is transferred from the database. That is, ray space data for one space unit is decoded together with transfer, and is stored on the main memory. Time-consuming processes are transfer of compressed ray space data and decoding of the compressed data, except for rendering of a virtual image. Hence, in the third example, ray space data is downloaded onto the main memory simultaneously with that of billboard images, and is stored on the main memory as encoded data. Ray space data required for rendering at an arbitrary viewpoint position in real time is decoded when its rendering request is generated.

Figure 35:
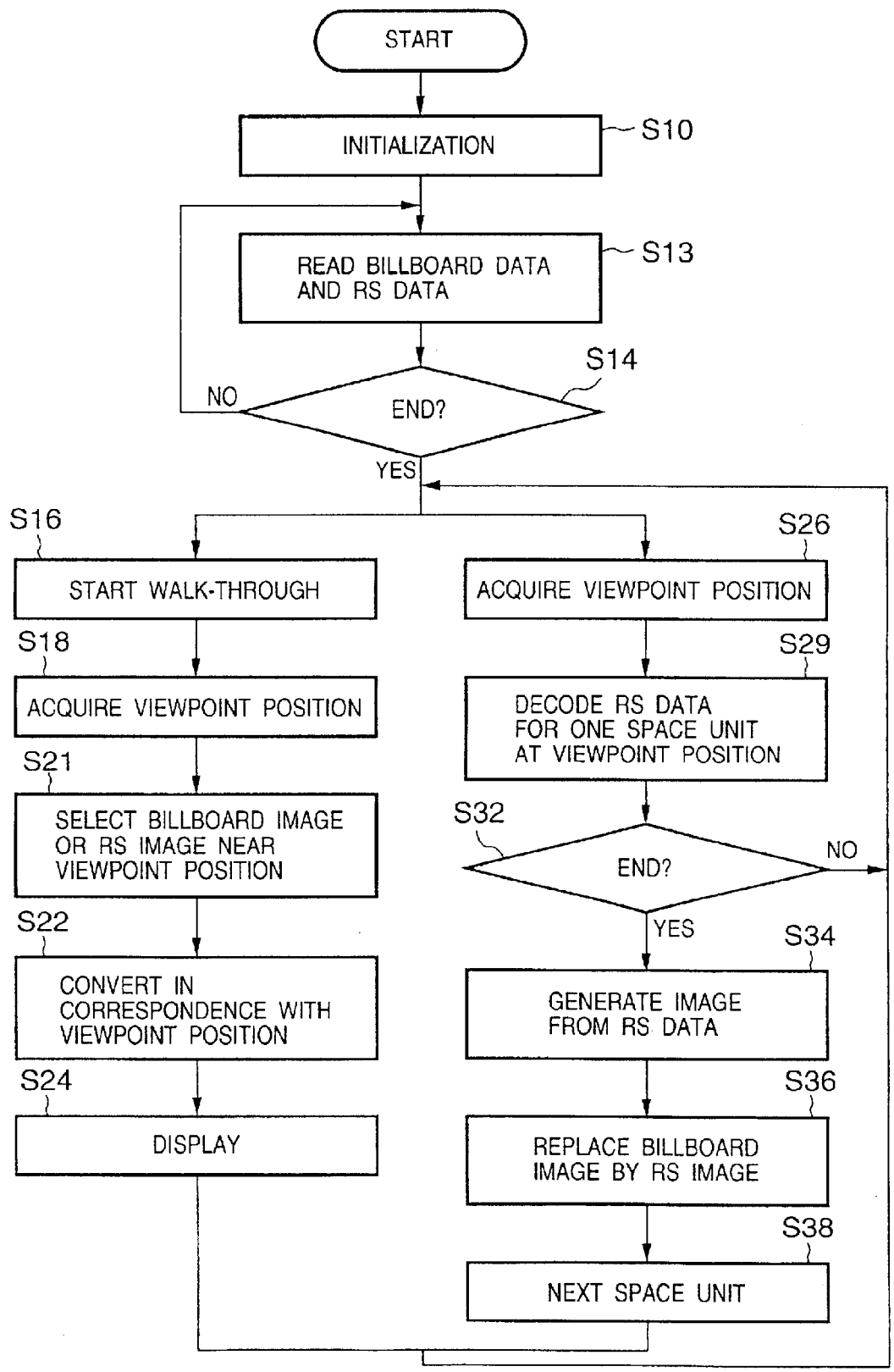
FIG. 35 is a flowchart for partially explaining the control sequence according to the third example of the first embodiment.

FIG. 35 is a flowchart showing the control sequence of the third example. The same step numbers denote the same processes by comparing the flowchart in FIG. 35 with the flowchart of the second example (FIG. 14), steps S12, S20, and S28 in the second example are respectively changed to steps S13, S21, and S29 in the third example. More specifically, billboard image data for all space units are downloaded and decoded in step S13, and ray space data for all space units are also downloaded in this step. Only ray space data of a space closest to the current user's viewpoint position is decoded in step S29, and the decoded data is used in virtual image generation in step S34. The generated virtual image is displayed in steps S16→ . . . →S24 and steps S36→S38.

In this manner, according to this third example, although the control must wait until downloading of encoded ray space data is completed, the same effect as in the first and second examples can be obtained, i.e., the user can experience walk-through based on billboard images in the virtual reality. Since only ray space data close to the current viewpoint position is decoded, the user can experience the virtual space at the viewpoint position in real time with high response. Even when decoding is not done in time, since at least a billboard image is presented, high real-time response can be assured.

In the third example, walk-through is disabled before all encoded ray space data are loaded into the main memory. Alternatively, upon completion of loading of billboard images, walk-through and loading of encoded ray space data may be done in parallel.

<Effect of First Embodiment>

According to the first embodiment described above, the following effects are obtained.

I: Since billboard image data are stored in advance in the main memory, even when no ray space is present in the DB, at least a partial image can be presented to the user, thus eliminating disturbance. Since the user can estimate the characteristics and the like of the virtual space of interest, even based on the billboard image, if the user determines that the space is unnecessary, the user can enter the next space.

II: Ray space data can be transferred in various modes. According to the method of the first example, since ray space data is transferred parallel to presentation of a virtual image in a predetermined order, walk-through and ray space data can be processed simultaneously.

III: The method of the first example does not always provide ray space data that the user currently wants. However, the method of the second example can present a virtual image based on image data in the space that the user currently desires.

IV: According to the third example, early walk-through experience in the virtual space and high real-time response can be achieved at the same time.

[Second Embodiment]

The first embodiment is effective when the main memory size is huge. However, the size of ray space data is huge, and a system memory (main memory) does not have an enough memory in many cases. The second embodiment allows rendering of a virtual space based on ray space data even when the memory size is small. That is, the system of the second embodiment estimates a partial virtual space that a user wants, and pre-fetches data of that partial virtual space (virtual subspace) before the user enters that subspace. In the second embodiment, since the memory size is limited, when the user leaves one subspace that user entered once and enters another subspace, ray space data of the previous space is erased. On the other hand, pre-fetch based on estimation may erroneously erase ray space data which has been stored on the memory and result in poor efficiency, if a wrong space is estimated. The second embodiment adopts a special devise (to be described later) to eliminate such shortcoming.

Figure 15:
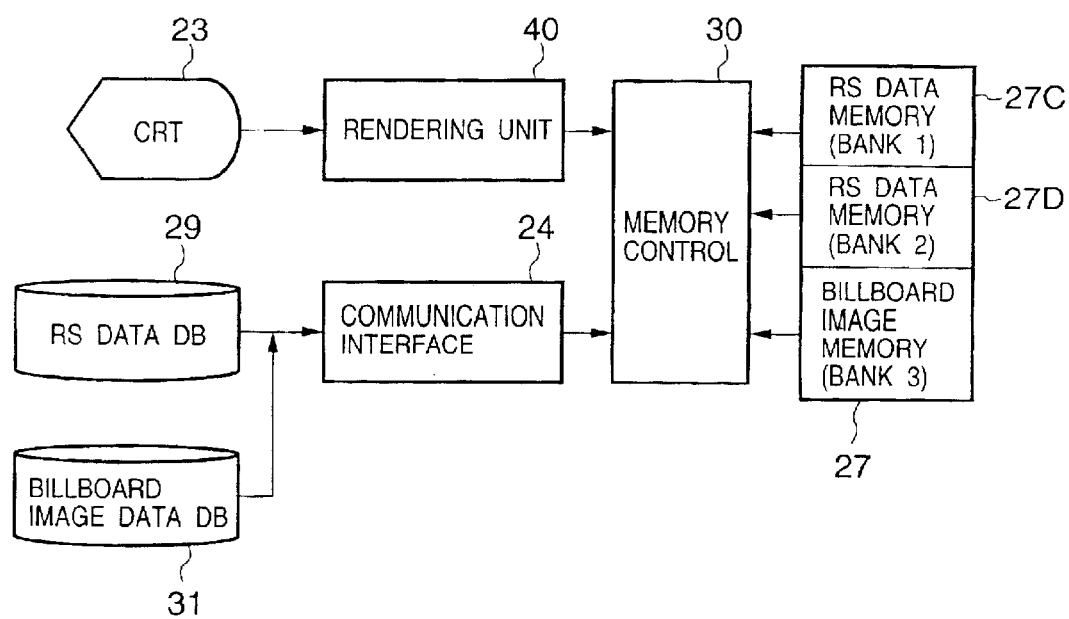
FIG. 15 is a block diagram for explaining the arrangement according to the second embodiment of the present invention.

FIG. 15 shows the hardware arrangement of an image processing apparatus according to the second embodiment. Unlike in the first embodiment, since the main memory 27 has a small size, a memory area for storing ray space data is segmented into areas (to be referred to as banks B1 and B2 hereinafter) for two units.

As a characteristic feature of the second embodiment, various kinds of information are embedded in advance in respective zones of the virtual space. That is, the virtual space is segmented into three different zones:

intermediate zone transition zone display target zone in the planar direction. The display target zone is a virtual zone which has as its first objective to display a virtual image based on ray space data, and is set in correspondence with the size of an exhibition room as a main object, as can be seen from an example shown in FIG. 16. In the example shown in FIG. 16, both zones A and B are "display target zones". The user can freely move inside this display target zone, and the system of this embodiment generates and displays a virtual image in correspondence with the moved viewpoint position of the user.

Outside the display target zone, the "transition zone" and "intermediate zone" indicating an assured moving route from this display target zone to another display target zone. The "transition zone" is a band-like zone which is formed to have a constant width around the display target zone in which the user stays currently. The intermediate zone is a moving area serving as a "moving path" formed across a plurality of display target zones.

Figure 16:
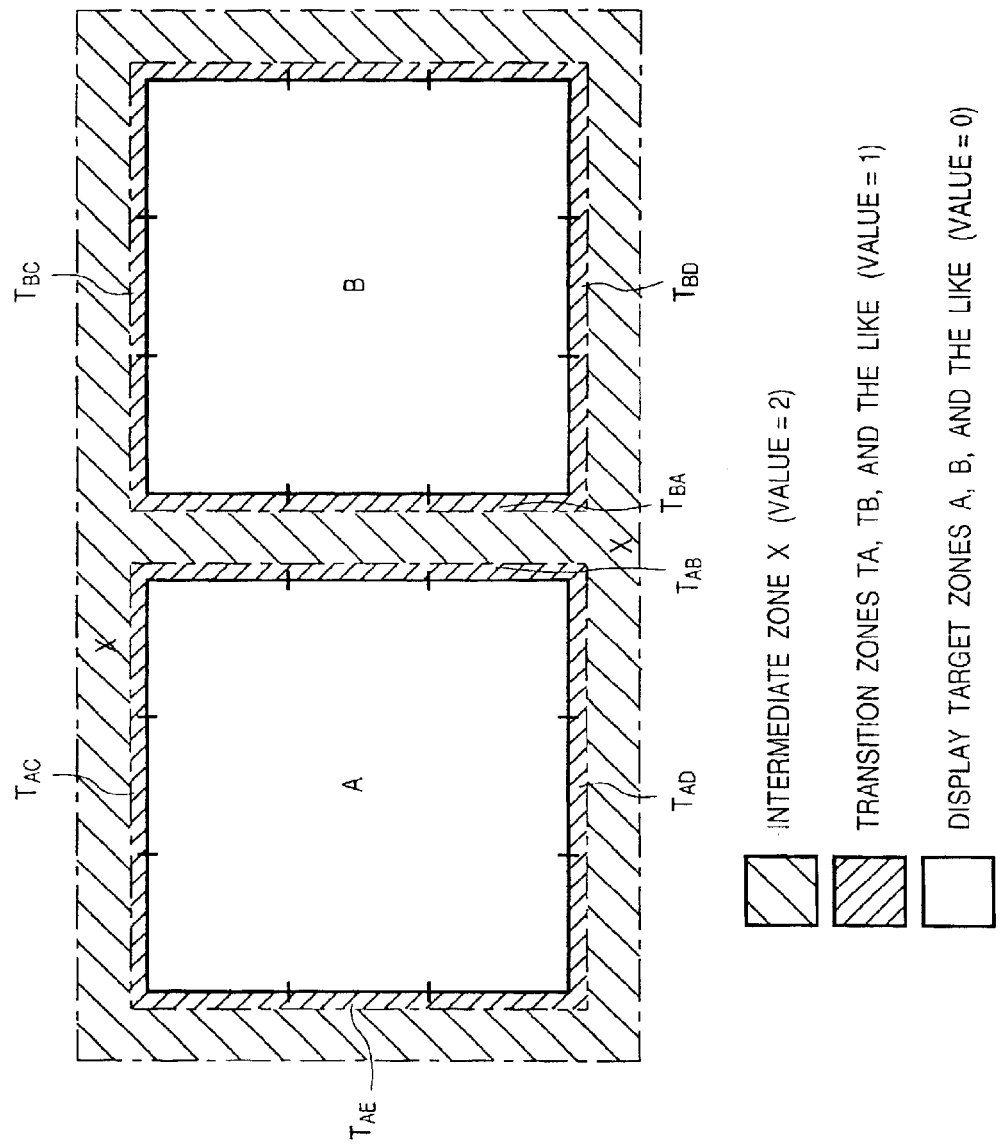
FIG. 16 is a view for explaining an example of the arrangement of a virtual space used of the second embodiment.

In the example in FIG. 16, transition zones $T_{AC}$, $T_{AB}$, $T_{AD}$, and $T_{AE}$ are assured outside display target zone A, and transition zones $T_{BC}$, $T_{BA}$, and $T_{BD}$ are assured outside display target zone B. For example, transition zone $T_{AC}$ is embedded with information for controlling transition between display target zones A and C. Of course, transition is present in two directions: transition in a direction to enter the display target zone, and transition in a direction to go outside (exit) the display target zone.

Each zone has an attribute value indicating its attribute, as shown in FIG. 17. In addition to the attribute value, when the zone of interest is a display target zone (attribute value=0), it has a "required image ID" (abbreviated as RQD-ID) field indicating an image required for rendering and display in that zone.

The transition zone handles transition between two display target zones, as described above. For this purpose, when the user's viewpoint position is located within a given transition zone, a change in direction of that viewpoint position has one of two directions. In order to make the transition zone of interest indicate transition from the internal display target zone to another display target zone, an "external demand image data ID" (abbreviated as EXT-DMND-ID hereinafter) field stores the ID of ray space data in the display target zone to which the viewpoint position is about to move, so as to request an image of the display target zone present outside the transition zone of interest (i.e., to issue a pre-fetch request since movement to the display target zone outside that transition zone is expected). Also, in order to make the transition zone of interest indicate transition from the external display target zone to the internal display zone, an "internal demand image data ID" (to be abbreviated as INT-DMND-ID hereinafter) field stores the ID of ray space data in the display target zone to which the viewpoint position is about to move, so as to request an image of the display target zone present inside the transition zone of interest (i.e., to issue a pre-fetch request since movement to the display target zone inside that transition zone is expected). Note that the "ID" is an identifier for designating a set of ray space data for one unit as in the first embodiment.

More specifically, in the example shown in FIG. 16 since transition zone $T_{AC}$ is present between display target zones A and C, the viewpoint position enters this transition zone $T_{AC}$ for the purpose of entering internal display target zone A, and for the purpose of entering external display target zone C. In the former case, a pre-fetch request of ray space image data A is issued as INT-DMND-ID, and in the latter case, a pre-fetch request of ray space image data C is issued as EXT-DMND-ID.

Outside the transition zone, the "intermediate zone" indicated by X in the example in FIG. 16. The intermediate zone allows movement without pre-fetch upon moving from a given display target zone to another.

Figure 8:
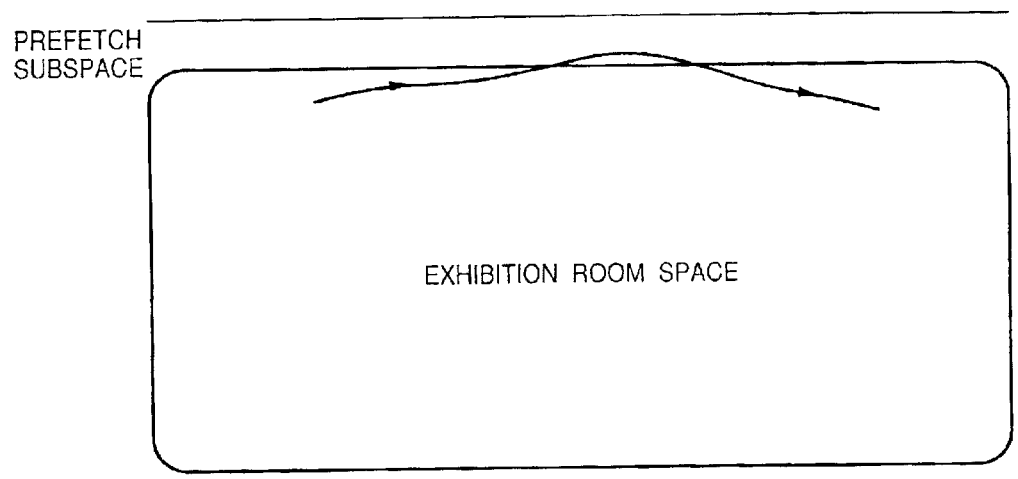
FIG. 8 is a view for explaining problems that may occur in a walk-through environment proposed by the present inventors.

A major objective of the transition zone is to implement pre-fetch of ray space data, which is required owing to a size reduction of the memory 27. When the memory size is reduced, a buffer storing ray space data which becomes unnecessary must be released earlier ("pre-released"). In such case, the objective of the intermediate zone is to prevent unwanted operations such as downloading of lost ray space data from the DB 29 when the buffer has been erroneously pre-released. That is, even when it is erroneously determined due to an operation error of the joystick or the like that the viewpoint position is about to leave the display target zone, the second embodiment does not immediately release the buffer (a memory area of the memory bank), and stores ray space data indicated by EXT-DMND-ID in the other free memory bank. In this way, even when the viewpoint position returns to the display target zone again in the example shown in FIG. 8, since ray space data of that display target zone is saved in the memory bank, it need not be downloaded.

Figure 18:
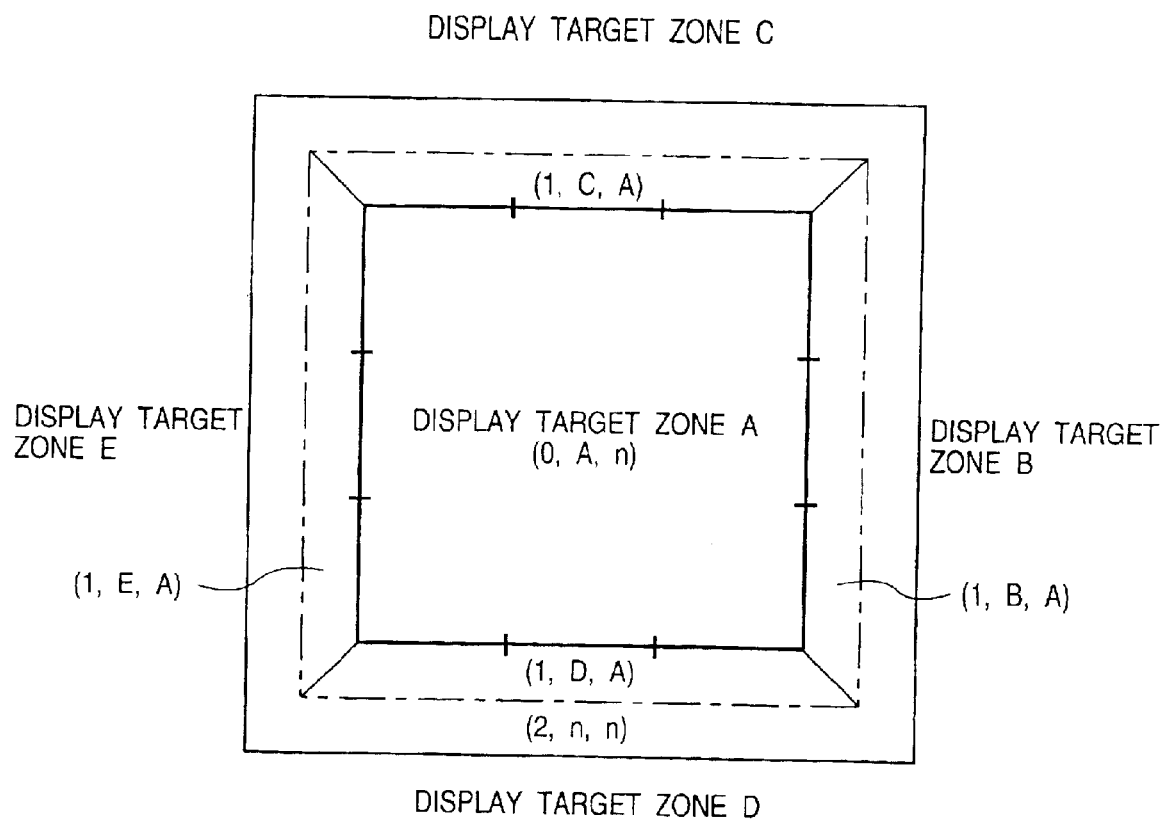
FIG. 18 is a view for explaining attribute values assigned to zone A in FIG. 16 in accordance with the attributes shown in FIG. 17.

FIG. 18 shows an example of zone attribute information embedded in various zones around display target zone A.

Figure 19:
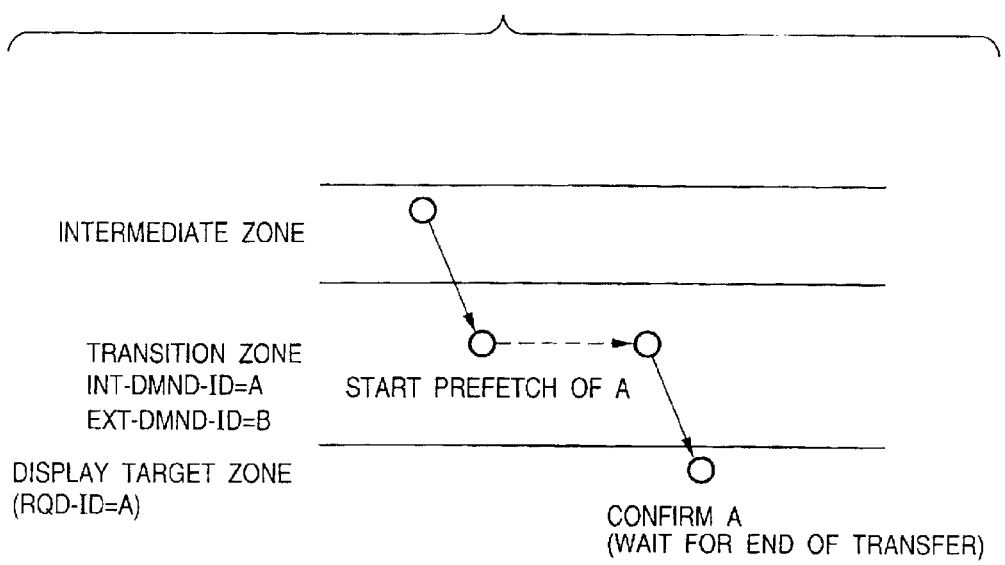
FIG. 19 is a schematic view for explaining principal control operations executed during movement of the user's viewpoint position from an intermediate zone to a display target zone via a transition zone of the second embodiment.

The control as a characteristic feature of the second embodiment while the user's viewpoint position moves to the intermediate zone→transition zone→display target zone will be explained below with reference to FIG. 19. As the image IDs embedded in the transition zone in this example, the ID (=INT-DMND-ID) of space data which is to be pre-fetched when the viewpoint position has moved from the intermediate zone to the transition zone is A, and the ID (=EXT-DMND-ID) of space data which is to be pre-fetched when the viewpoint position has moved from the display target zone to the transition zone is B. That is, when the viewpoint position has moved from the intermediate zone to the transition zone, INT-DMND-ID in the zone attribute information is read out to detect that space data of the upcoming display target zone is A, and downloading of that space data from the DB 29 to bank $B_1$ (for example) starts. Since space data A includes ray space data of the entire display target zone A, it is effective to pre-fetch this data since a ray space can be immediately used when the viewpoint position has actually reached display target zone A. When the viewpoint position has moved from the transition zone to the display target zone, since RQD-ID of this display target zone is A, it is confirmed if space data A is stored in the memory area (e.g., bank $B_1$) of the main memory 27 by downloading mentioned above. If downloading is not complete yet, the user waits completion of downloading within this display target zone.

Figure 20:
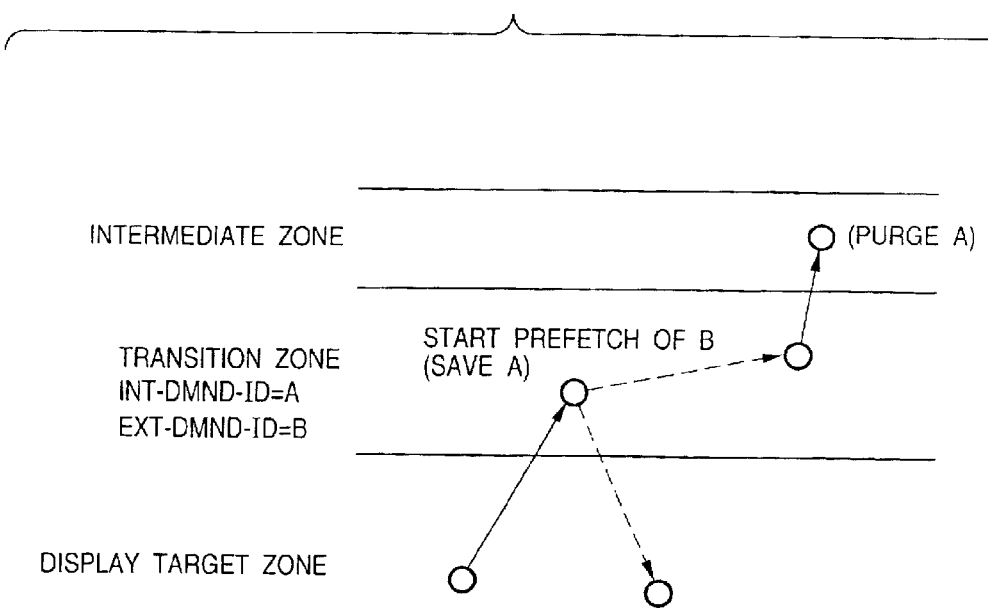
FIG. 20 is a schematic view for explaining principal control operations executed during movement of the user's viewpoint position from the display target zone to the intermediate zone via the transition zone in the second embodiment.

The control as a characteristic feature of the second embodiment while the user's viewpoint position moves to the display target zone→transition zone→intermediate zone, i.e., during a moving process to another display target zone, will be explained below with reference to FIG. 20.

When the viewpoint position has moved from the display target zone to the transition zone, EXT-DMND-ID in the zone attribute information is read out to detect that space data of a display target zone that neighbors display target zone A in which the viewpoint position stayed so far is B. Then, downloading of that space data from the DB 29 starts. Since space data A has already been stored in bank $B_1$, the download destination of space data B is bank $B_2$. That is, space data A in bank $B_1$ remains saved.

In the second embodiment, while the viewpoint position stays in a given transition zone, space data for the lower-order display target zone of that transition zone is held. As a result of holding the Ray Space Data A, even when the user returns to the display target zone again, space data A in bank $B_1$ can be used, thus preventing ray space data A from being downloaded again. Also, since pre-fetch of ray space data B for the next display target zone has already started, when the user reaches display target zone B, it is expected that ray space B can be rendered immediately.

In the second embodiment, the holding time of ray space data of the previous display target zone while the viewpoint position stays in the transition zone is limited to a predetermined time. This time should be varied or set in advance in correspondence with the size of a ray space for one unit, the user's preference, and the size of the virtual space, but it is set at, e.g., 5 sec in the second embodiment for the sake of simplicity. That is, in an example shown in FIG. 21 after the viewpoint position moves from display target zone A to transition zone, it returns to the display target zone, moves to the transition zone again, returns to the display target zone, and then moves to the transition zone. During these movements, since the staying times in the transition zone are less than 5 sec, ray space data A remains held.

On the other hand, in an example shown in FIG. 22 since the viewpoint position stays in the transition zone for 5 sec, data A in bank $B_1$ is purged (invalidated) and that buffer is released, although the viewpoint position stays in the transition zone.

Figure 21:
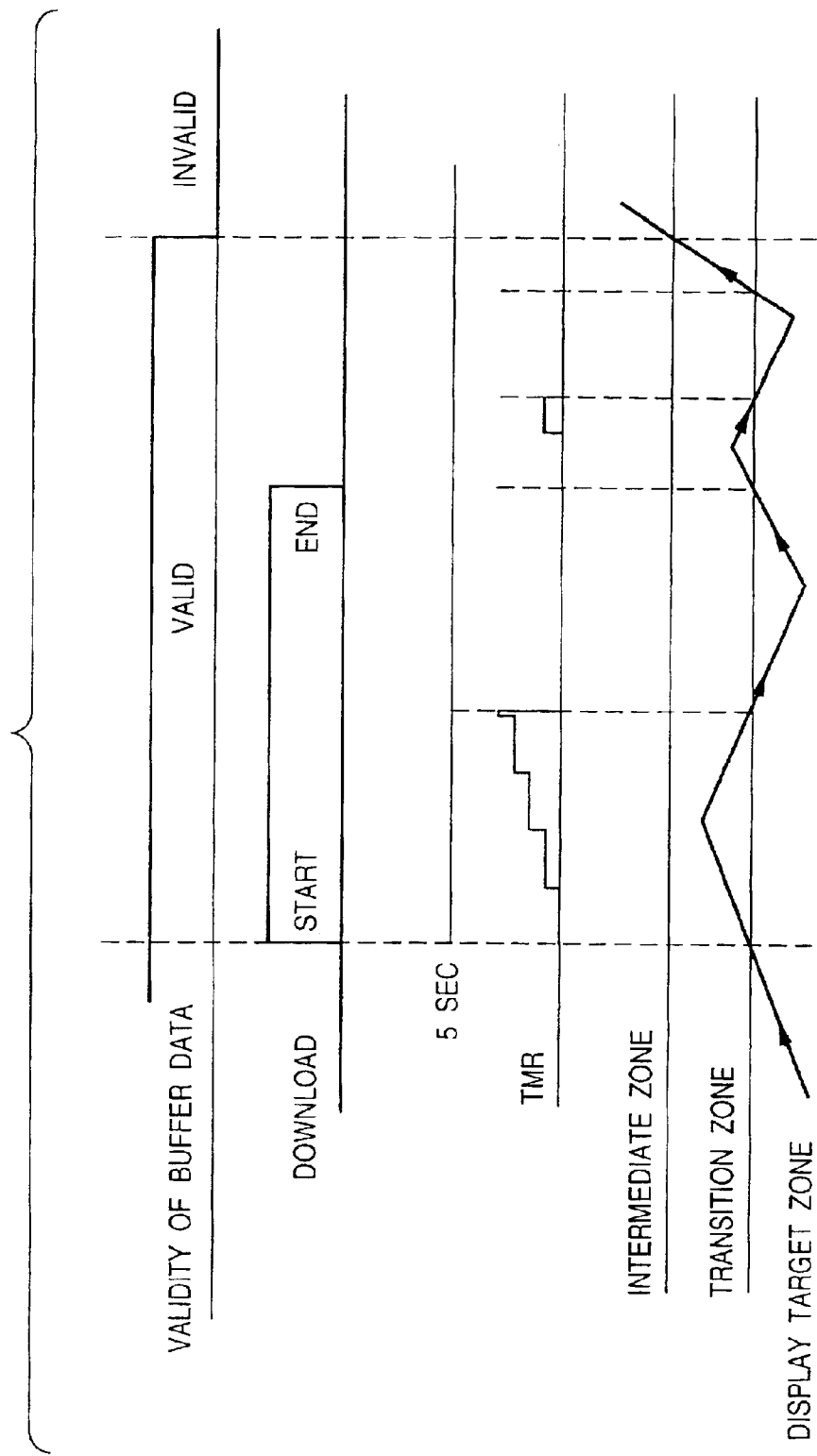
FIG. 21 is a schematic view for explaining control operations executed during reciprocal movements of user's viewpoint position between the display target zone and transition zone of the second embodiment.

While the user's viewpoint position stays in the transition zone, as shown in FIG. 21, when the user moves the viewpoint position at the peripheral portion of the display target zone using the mouse or joystick, the user is in the display target zone, the viewpoint position may inadvertently enter the transition zone, and a recognition error for the user may occur. However, when the viewpoint position stays in the transition zone for 5 sec or more, since the user is highly likely to leave the previous display target zone, ray space data of that zone saved in the buffer can be discarded.

The control sequence of the second embodiment will be explained below with reference to the flowcharts and the like. Note that FIGS. 23 to 26 are tables for explaining various registers used in this control sequence, and the actual control sequence is shown in FIG. 27 and the subsequent figures.

Figure 27:
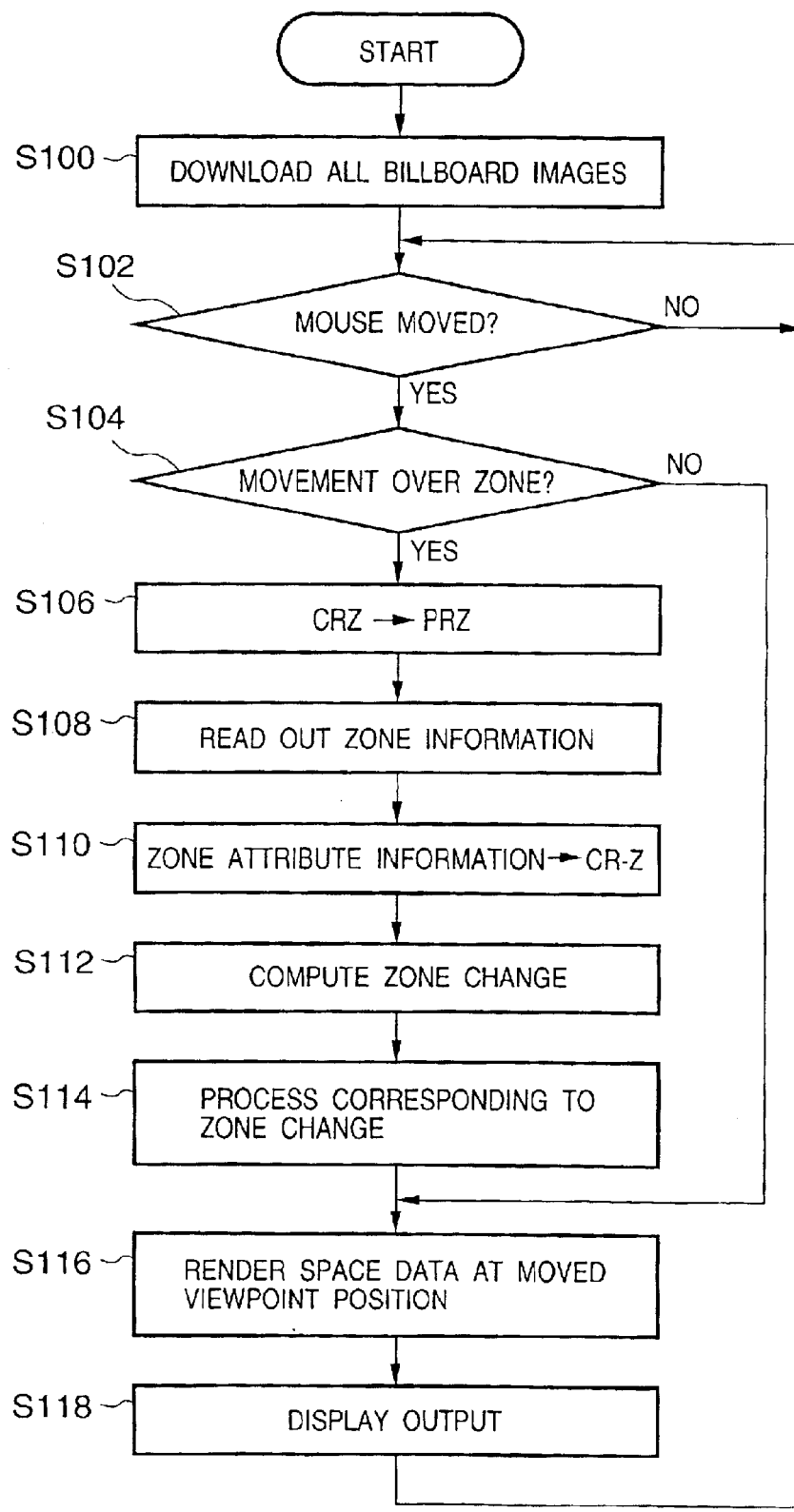
FIG. 27 is a flowchart showing the main routine of the control sequence of the second embodiment.

FIG. 27 shows the main routine of the control sequence of the second embodiment.

More specifically, in step S100 billboard images are downloaded from the billboard image DB 31. In the second embodiment, a virtual image based on ray space data is displayed in the display target zone such as an exhibition room in principle. However, as described above, since the bank size for storing ray space data in the main memory is small, ray space data is pre-fetched every time the viewpoint position approaches a given display target zone. For this reason, ray space data is not ready for display in some cases when the user has entered the display target zone. The billboard image is displayed as a substitute image in such case.

If all billboard images are downloaded onto bank $B_3$ of memory 27 in step S100, the user is given walk-through permission in step S102 and subsequent steps.

Figure 28:
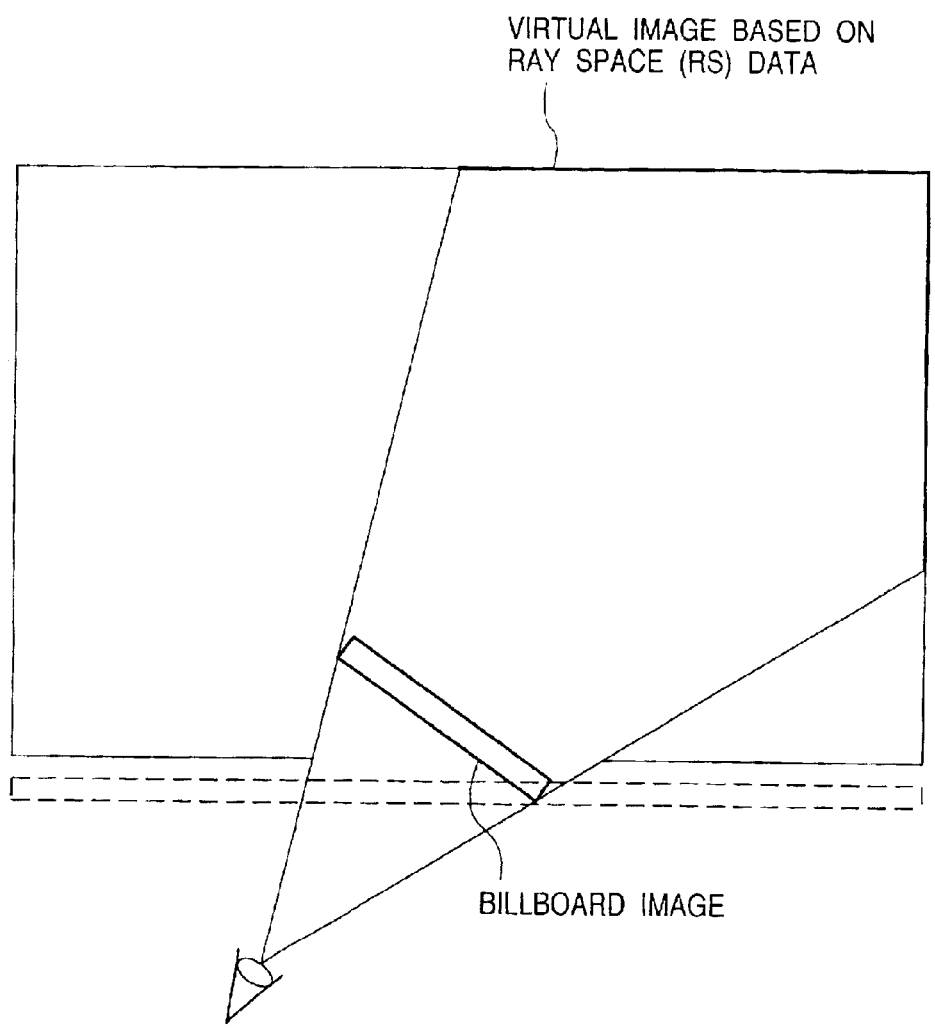
FIG. 28 is a view for explaining the relationship between virtual images based on ray space data and billboard image data of the second embodiment (also of the first embodiment)

It is checked in step S102 if the user has moved the virtual viewpoint position by operating the joystick or the like. If YES in step S102, it is checked in step S104 if the movement has been made beyond the zone. If NO in step S104, the flow jumps to step S116 to generate and display a virtual image at that viewpoint position. In this case, if no ray space data is present, a billboard image is displayed; if ray space data is present, that ray space data is converted into a virtual image, and the virtual image is displayed. FIG. 28 shows a case wherein a virtual image based on ray space data is displayed, and a case wherein a billboard image is displayed, in correspondence with the viewpoint position. Note that each billboard image is described in VRML (Virtual Reality Modeling Language) in the first embodiment described above and the second embodiment. As a merit of displaying a billboard image, when the user walks through the virtual space, the user often browses in a target subspace, and in such case, the user's objective is sufficiently achieved by the billboard image rather than a high-resolution image based on ray space data.

If the zone has been changed due to the viewpoint position movement by the user, the flow advances to step S106. In step S106, the attribute value of the display target zone stored in register CR-Z (see FIG. 25) is saved in register PR-Z. The zone attribute information (FIG. 17) of the zone of interest is read out in step S108, and its attribute value is held in register CR-Z in step S110. In step S112, a zone change is detected by comparing the attribute value of the previous zone in register PR-Z and that of the current zone in register CR-Z. Note that the zone change can be detected as a change in attribute value, and in the second embodiment, four different changes are available:

2→1 (intermediate zone→transition zone)
1→0 (transition zone→display target zone)
0→1 (display target zone→transition zone)
1→2 (transition zone→intermediate zone)

Hence, in step S114 a process corresponding to such change is done.

<Intermediate Zone→Transition Zone>

When the viewpoint position has moved from the intermediate zone to the transition zone, the user is highly likely to further move the viewpoint position from this transition zone to display target zone. On the other hand, in the second embodiment, ray space data of the display target zone that the user wants to experience must have been pre-fetched in the previous transition (2→1 movement in FIG. 29) to the transition zone that follows the display target zone. Hence, which of memory banks $B_1$ or $B_2$ stores ray space data having INT-DMND-ID as the attribute information of this transition zone is confirmed in step S200. This confirmation is implemented by selecting one of registers $F_{B1}$ and $F_{B2}$, which has a value "1" (intra-bank data is effective), and determining a memory bank that stores ray space data based on the value of register $ID_{BX}$ corresponding to bank $B_x$ with the value "1". If ray space data has already been downloaded into the bank, the control exits the control sequence shown in FIG. 29 and returns to the main routine.

If ray space data is not downloaded yet, it is checked in step S202 if downloading is underway. This checking is done by checking the value of register COM (see FIG. 26) that manages the state of the communication interface 24 (see FIG. 15). If COM=1, it is determined that downloading of ray space data to either bank is underway, and the control returns to the main routine. In step S202, the control does not wait for completion of downloading. This is because downloading may be completed while the viewpoint position moves from this transition zone to the next display target zone. Whether or not downloading is underway is more preferably confirmed by checking if the value of resister $F_{B1}$ or $F_{B2}$ is 3.

If ray space data is not downloaded yet, downloading (pre-fetch) from the database DB 29 is done in step S204 and subsequent steps. That is, in step S204 a free memory bank is searched for. The free memory bank is the one corresponding to register $F_B$ (resister $F_{B1}$ or $F_{B2}$)=0 (FIG. 23). If such bank is found, the bank number is stored in work register WK (=1 or 2). In step S206, the value of resister $F_{BWK}$ of that bank $B_{WK}$ is set to be a value "3" indicating that downloading is underway. In step S208, a transfer request for downloading is sent to the ray space DB 29. In step S210, the value of the register of the communication interface 24 is set at COM=1 to indicate that downloading is underway.

In this manner, when the viewpoint position has entered the transition zone from the intermediate zone, the storage state of ray space data of the display target zone which the viewpoint position is to enter is checked. If the ray space data is not stored yet, it is downloaded to start pre-fetch of the ray space data.

Figure 29:
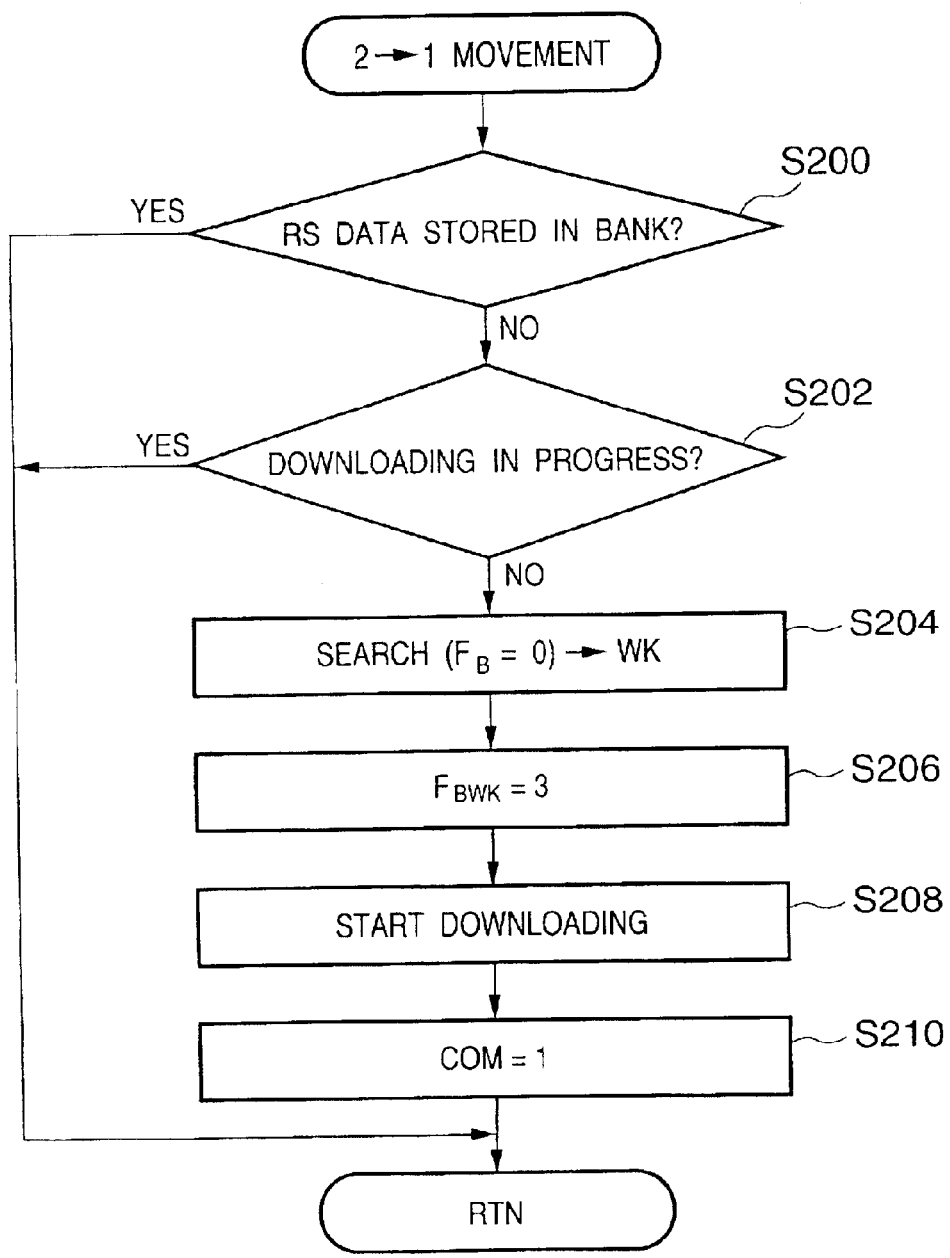
FIG. 29 is a flowchart for partially explaining the control sequence of the second embodiment.

If NO in step S200 (the required ray space data is not present in the memory bank), it is checked in step S202 if downloading of that data is underway, and the control returns from the control sequence in FIG. 29 to step S116 in FIG. 27 irrespective of the checking result. Since a virtual image is rendered based on space data at that moved viewpoint position in step S116, if ray space data is present, rendering based on ray space data is done; if downloading is not complete yet, a billboard image is displayed as a substitute.

<Transition Zone→Display Target Zone>

Figure 30:
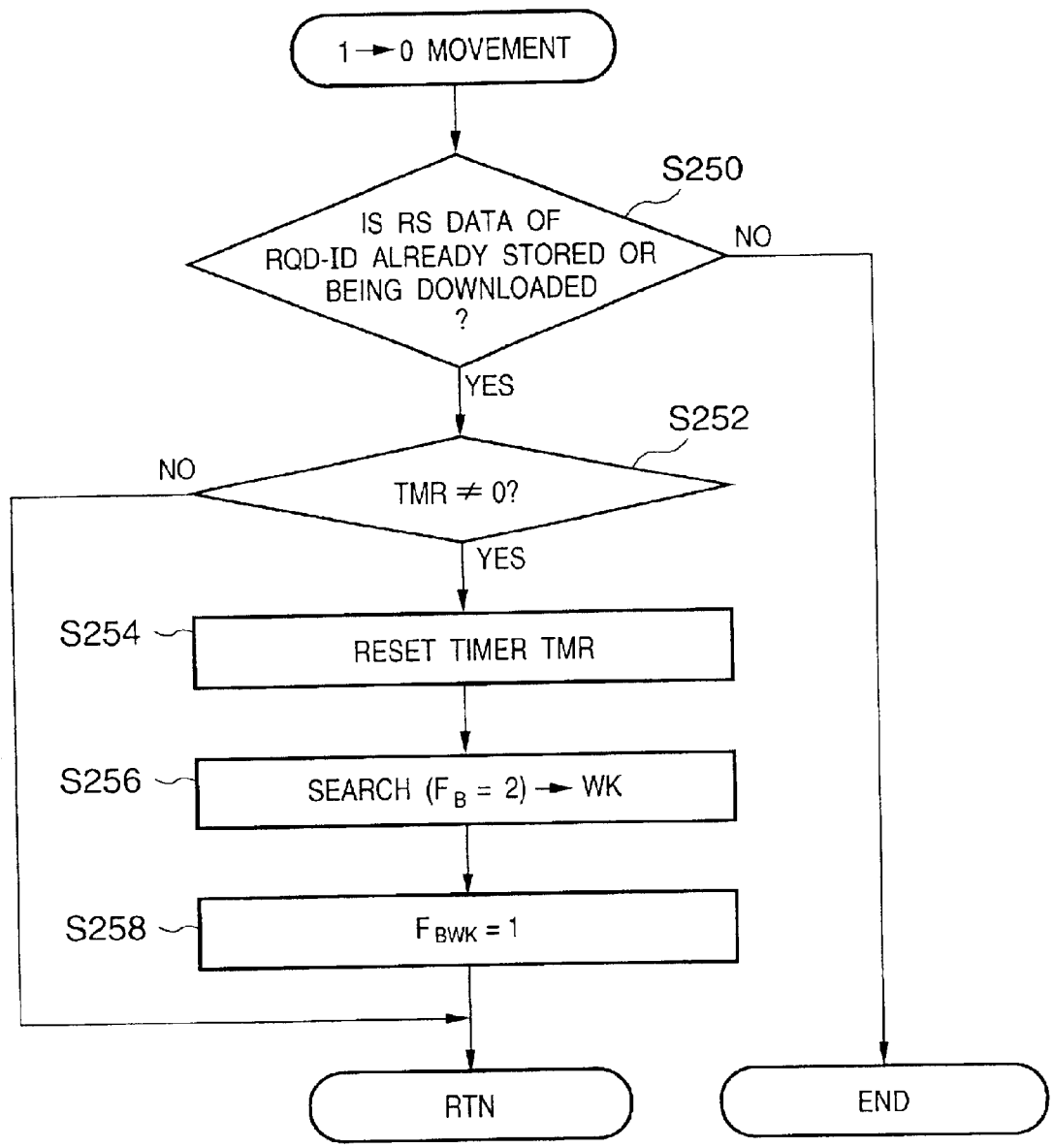
FIG. 30 is a flowchart for partially explaining the control sequence of the second embodiment.

FIG. 30 shows the control sequence executed when the viewpoint position has moved from the transition zone to the display target zone. The movement "transition zone→display target zone" includes a movement in which the viewpoint position moves from the display target zone to the transition zone, and then returns from that transition zone to the display target zone, as shown in FIG. 21, in addition to a normal movement "intermediate zone→transition zone→display target zone". In either case, the required space data must already be present in the memory bank or its downloading to that memory bank must be underway. If NO in step S250, since an error has occurred, the control ends. This checking is done by searching the table shown in FIG. 24 with reference to a value corresponding to the required image ID (RQD-ID) of the attribute information (FIG. 17) of the display target zone of interest. That is, when the viewpoint position has entered display target zone A, if $B_A$=1, ray space data A is stored in bank $B_1$; if $B_A$=2, ray space data A is stored in bank $B_2$.

If YES in step S250, i.e., the required ray space data is already present in the memory bank or downloading of that data is in progress, it is checked in step S252 if the value of timer TMR is zero. That is, in movement "display target zone→transition zone", since 5-sec timer TMR has been started, when the viewpoint position returns to the display target zone again, this timer TMR must be reset. Hence, it is checked in step S252 if 5-sec monitor timer TMR has been started. If YES in step S252, timer TMR is reset in step S254.

In steps S256 and S258, ray space data temporarily marked "gray" is restored to "valid" data. The processes in steps S256 and S258 will be described later in association with a description of step S290 and subsequent steps in FIG. 31.

In this way, the user can experience the virtual space based on ray space data in the display target zone.

<End of Downloading>

When downloading ends, the operating system interrupts this control sequence. When this interrupt is detected, the control sequence shown in FIG. 34 starts.

Figure 34:
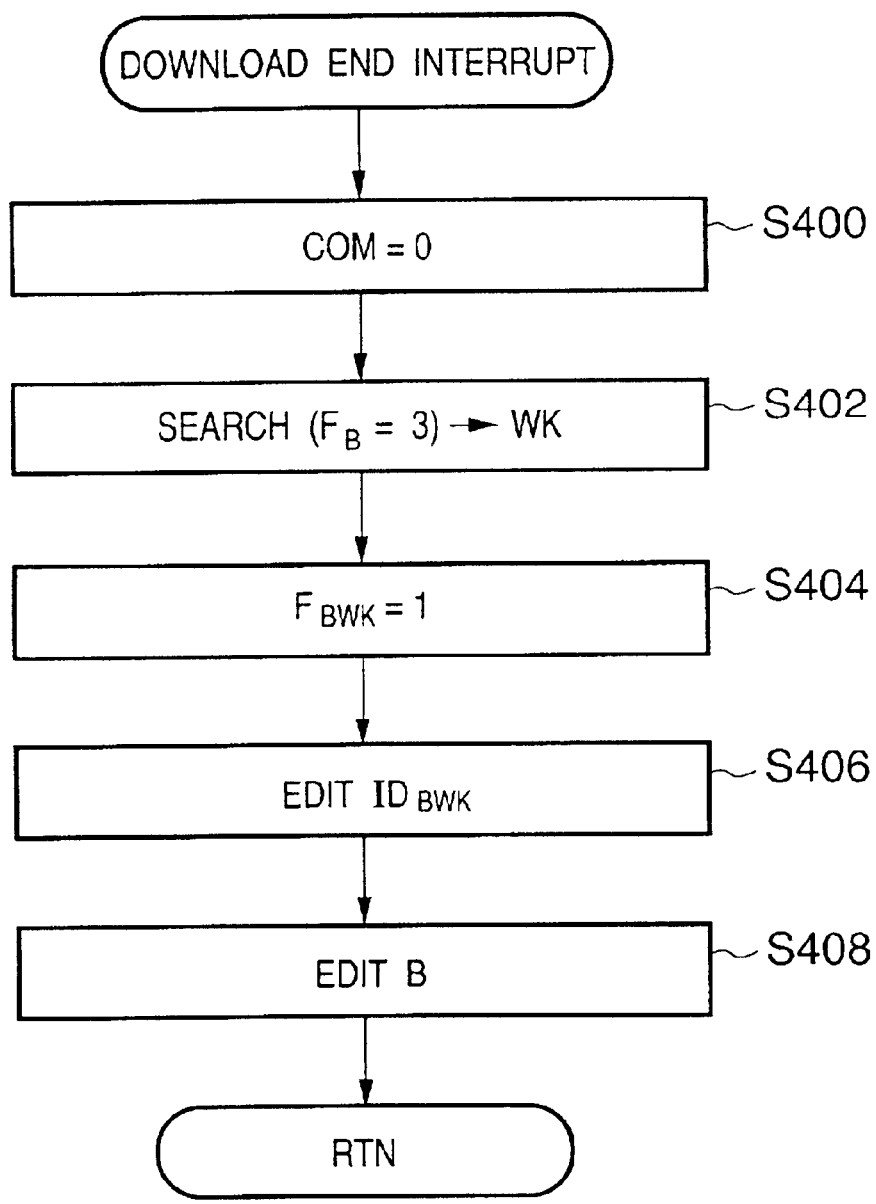
FIG. 34 is a flowchart for partially explaining the control sequence of the second embodiment.

In step S400 in FIG. 34, the state of the communication interface 24 is set in an idle state (COM=0). In step S402, a memory bank in which data was stored by downloading is checked. That is, a bank with $F_B=3$ is searched for, and its band number is saved in work register WK. In step S404, the value of register $F_{BWK}$ of that bank is set at "1" to indicate that data is valid. Furthermore, in step S406 the value of $ID_{BWK}$ is set to be an identifier (A, B, C, . . . ) of ray space data to identify data stored in bank $B_{WK}$. Moreover, in step S408 the value indicating the identifier of the downloaded ray space data is set in register B (FIG. 24) that indicates the storage location of space data.

In this manner, the location of the bank that stores valid ray space data can be checked based on registers $F_{B1}$, $F_{B2}$, $ID_{B1}$, $ID_{B2}$, $B_A$, and the like.

<Display Target Zone→Transition Zone>

Figure 31:
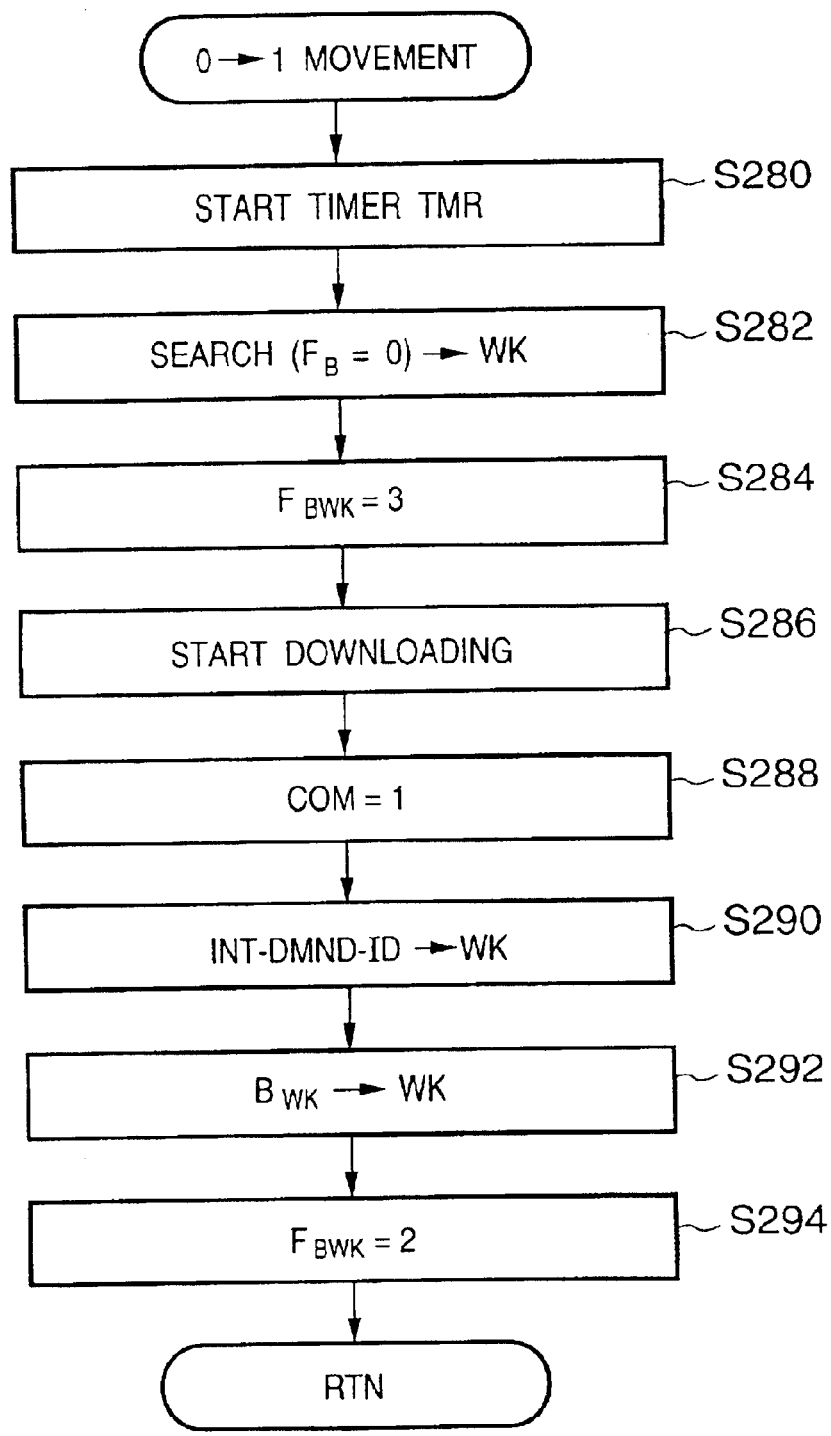
FIG. 31 is a flowchart for partially explaining the control sequence of the second embodiment.

FIG. 31 shows the control sequence when the viewpoint position has moved from the display target zone to the transition zone.

More specifically, timer TMR is started in step S280. Whether or not timer TMR generates time-out (the TMR value reaches a predetermined value) is monitored in the control sequence in FIG. 33.

In step S282 and subsequent steps, preparation for downloading ray space data of the next display target zone (neighboring display target zone) is made. That is, a bank corresponding to register $F_B=0$ is searched for to find a free bank memory, and its bank number is stored in work register WK in step S282. In step S284, this memory bank $B_{WK}$ is marked ($F_{BWK}=3$) to indicate that downloading is underway. In step S286, a download start command is sent to the interface 24. In step S288, the state of the interface 24 is marked (COM=1) to indicate that downloading is underway.

Furthermore, in step S290 and subsequent steps, ray space data used for the purpose of rendering in the previous display target zone (the one where the user stayed so far) is marked to indicate "gray". As described above, when the viewpoint position has moved from the display target zone to the transition zone, since it is highly likely to move to another display target zone, the ray space data used in the previous display target zone is highly likely to become unnecessary. However, in the second embodiment, this ray space data is held in consideration of operation errors of the joystick, as has been explained above with reference to FIGS. 21 and 22. Since the ray space data held in the memory bank may be erased, the state of such data is called a "gray" state in this embodiment. Note that ray space data in the "gray" state is erased in step S302 in FIG. 32 as the control sequence for 1→2 movement.

In step S290, the identifier of ray space data used in the previous display target zone is detected from the value of INT-DMND-ID of the transition zone of interest, and this value is stored in work register WK. In step S292, the number of the memory bank in which the ray space data of interest is stored is detected with reference to register B (FIG. 24) that holds the storage location of an image, and that value is stored in work register WK. In step S294, the state of this memory bank is set at $F_{BWK}=2$ to mark "gray".

In this manner, in the control sequence in FIG. 31, pre-fetch of ray space data for the next display target zone starts, and ray space data used so far is set in the "gray" state so that the data can be restored anytime it is required.

If the user operates to return the viewpoint position to the previous display target zone again, that operation is detected as movement "transition zone→display target zone", and is processed in step S256 in FIG. 30. More specifically, a bank in the gray state is searched for in step S256, and its state value is set at $F_B=1$ in step S258.

Note that as a result of downloading that has started in step S286, ray space data for the next display target zone is soon marked on the bank to indicate that the data is valid ($F_B=1$), i.e., valid image data are stored in both of the two memory banks (B1 and B2). In the second embodiment, since an image is rendered in accordance with the value of register B in FIG. 24, the two valid ray space data are never confused.

<Transition Zone→Intermediate Zone>

Figure 32:
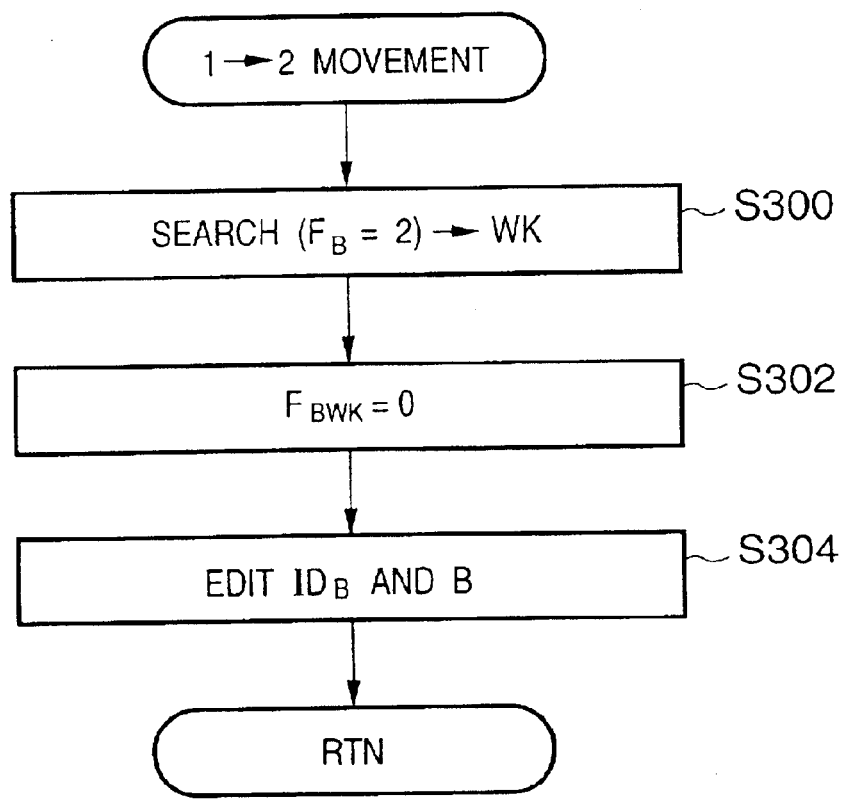
FIG. 32 is a flowchart for partially explaining the control sequence of the second embodiment.

When the viewpoint position has moved from the transition zone to the intermediate zone, the control sequence shown in FIG. 32 is executed.

More specifically, in step S300 in order to purge the ray space data in the gray state, a bank that stores the ray space data of interest is searched for. That is, in step S300 bank with $F_B=2$ is checked, in step S302 its bank number is stored in work register WK, and the state value of register $F_{BWK}$ of that bank is set at 0 to indicate data is invalid in step S302. Furthermore, the values of the corresponding register $ID_B$ (FIG. 23) and register B (FIG. 24) are re-set to reflect invalidation of the data in step S304.

<Generation of Time-out>

Figure 33:
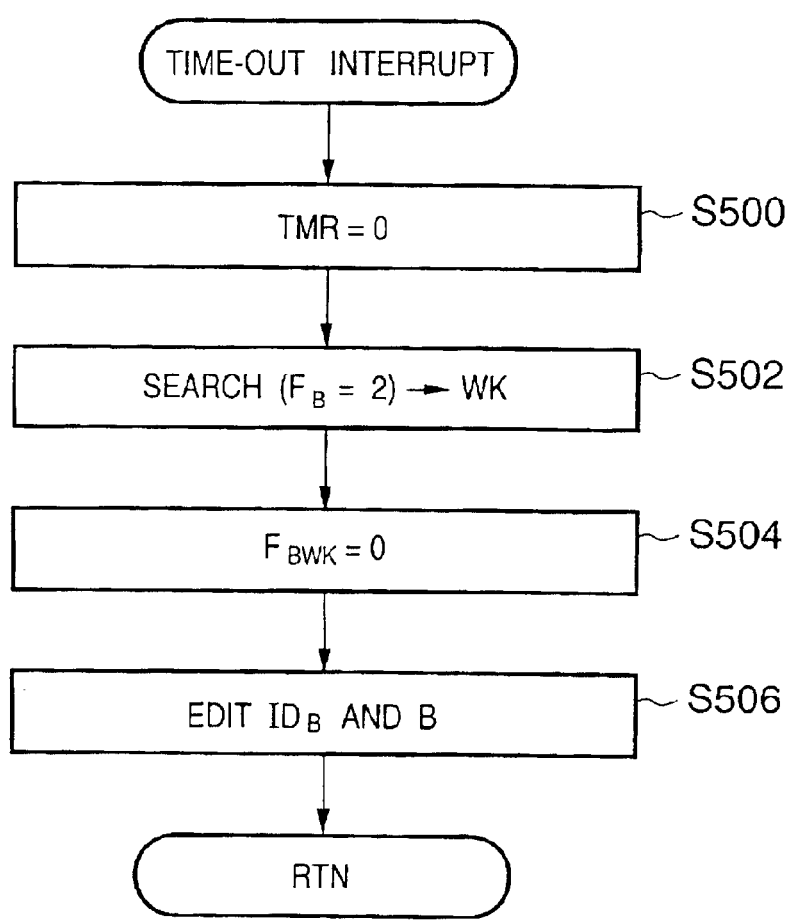
FIG. 33 is a flowchart for partially explaining the control sequence of the second embodiment.

The control sequence executed when 5-sec timer TMR generates time-out will be explained below with reference to FIG. 33. This timer TMR is effective only when the user's viewpoint position falls within the transition zone.

In step S500, timer TMR is reset. In step S502, a bank that stores ray space data in the "gray" state is searched for, and its bank number is stored in work register WK. In step S504, the value of state register $F_{BWK}$ of the bank with that number is set at "0" (data invalid). In step S506, the values of associated registers $ID_B$ (FIG. 23) and register B (FIG. 24) are re-set to reflect invalidation of the data.

In this manner, when the viewpoint position stays in the transition zone for a predetermined time or more, it is estimated that the user intends to leave the previous display target zone, and the ray space data in the gray state is invalidated. In other words, the buffer is automatically released in place of the user.

[Modification] . . . Second Embodiment

Various modifications of the second embodiment may be made.

I: For example, in the second embodiment, two zones, i.e., the transition zone and intermediate zone, bound a single display target zone. However, the number of these zones is not limited to two. For example, two transition zones, i.e., an upper-layer transition zone and lower-layer transition zone may be provided. That is, in the second embodiment, ray space data is pre-fetched when the viewpoint position moves toward the next display target zone (movement "display target zone→transition zone). Note that data is also pre-fetched when the viewpoint position moves from the intermediate zone to the display target zone. However, this pre-fetch starts in the transition zone as the layer next to the display target zone, and the viewpoint position immediately moves from the transition zone to the display target zone, resulting in poor practical effect. Hence, as described above, two layers of transition zones are provided, so that pre-fetch is done in the upper-layer transition zone when the viewpoint position enters the display target zone of interest, and pre-fetch is done in the lower-layer transition zone when the viewpoint position moves from the display target zone of interest to another display target zone. In this case, the need for the intermediate zone is obviated.

II: In the second embodiment, for example when movement "display target zone A→transition zone from A to B→intermediate zone→transition zone for C→display target zone C" is made, ray space data for display target zone B is pre-fetched in the transition zone from A to B. However, since the viewpoint position has consequently moved to display target zone C, that pre-fetch is not efficient one.

To cope with such situation, since all intermediate zones are segmented in correspondence with display target zones, inefficient pre-fetch can be prevented.

III: In the above embodiment, ray space data is taken as an example. However, the present invention is not limited to such specific data, and can be applied to space data that requires a certain time for data transfer, i.e., every other space data that require a long data transfer time which bottlenecks a real-time process.

Therefore, the present invention is not limited to application to a system in which a main memory and DB are connected via a communication line, but whether or not the process of the present invention is required should be determined depending on the degree of demand for real-time response of that application. Therefore, in some cases, the present invention can be applied to a system in which a main memory and database DB are connected via a parallel bus.

Figure 36:
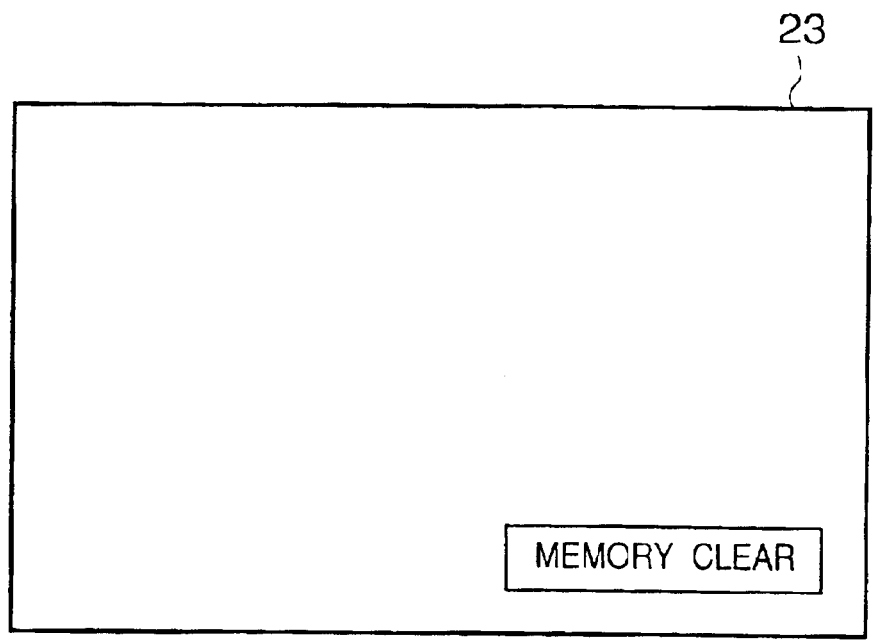
FIG. 36 is a view for explaining the shape of an icon according to a modification of the second embodiment.

IV: In the second embodiment, ray space data marked in the gray state is erased when the viewpoint position stays in the transition zone for a predetermined time. Furthermore, erasure of such ray space data may be started in response to predetermined keyboard operation by the user (or operation for a predetermined icon shown in, e.g., FIG. 36).

V: In the second embodiment, encoded ray space data is stored in the database 29, and is decoded every time it is downloaded from that database. However, as has been explained in association with the third example of the first embodiment, a decoding process of encoded space data requires much time, while encoded space data does not require a large memory space. More specifically, the main memory equipped in the system may have a memory size large enough to store all encoded ray space data. Hence, when the main memory 27 has an enough margin, the second embodiment is modified as in the third example, i.e., a modification in which all ray space data are downloaded onto the memory 27, and only ray space data at the moved user's viewpoint position is decoded in real time is proposed.

In this modification, a dedicated decoding processor or task is added to the second embodiment, and downloading of the second embodiment is modified to correspond to a decoding process. That is, the flag (COM) indicating whether or not downloading is underway is changed to that indicating whether or not decoding is underway, and the flag ($F_B$ in FIG. 23) indicating whether or not intra-bank data is valid is changed to that indicating whether or not data is decoded. Also, in this modification, ray space data of all the display target zones are downloaded together with billboard image data in step S100 (FIG. 27). After these modifications, pre-fetch of ray space data from the database when the viewpoint position enters a new display target zone is changed to an operation for pre-decoding encoded data.

With such modification, the real-time process can be further improved more than the second embodiment.

As described above, according to the present invention, since the range of space data to be downloaded or that of space data to be decoded is limited to a predetermined range from the viewpoint position, the time required for downloading or decoding can be shortened, and as a result, space rendering that can assure high real-time response can be implemented.

When the user walks through a virtual space, data which is temporarily downloaded to render a given virtual space can be avoided from being downloaded again.

Furthermore, since the memory is released if a predetermined condition is satisfied, the memory can be effectively used.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts (FIG. 13 and/or FIG. 14 and/or (FIG. 27 and, FIG. 29 to FIG. 34) and/or FIG. 35) described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. A space rendering method for rendering a virtual space, comprising the steps of:
   storing space data of a plurality of virtual spaces in a first memory;
   rendering a first virtual space at an arbitrary indicated position, which belongs to a first zone, on the basis of first space data, which has been downloaded from the first memory to a second memory different from the first memory;
   holding the first space data in the second memory and downloading space data of a second zone from the first memory to the second memory when the indicated position has moved into the second zone different from the first zone; and
   releasing the first space data held in the second memory when the indicated position moves into a third zone different from the second zone after the indicated position has moved from the first zone to the second zone.

2. The method according to claim 1, wherein when the indicated position has moved from the first zone to the second zone, and then stays in the second zone, a measurement of a staying time in the second zone is started.

3. The method according to claim 1, wherein when the indicated position has returned from the second zone to the first zone, the first space data held in the second memory is used as a basis of rendering of the virtual space.

4. The method according to claim 1, wherein when the indicated position has moved from the first zone to the second zone, and a user makes predetermined instruction operation while the indicated position stays in the second zone, the first space data held in the second memory is released.

5. The method according to claim 1, wherein the third zone bounds both the second zone of the first virtual space and a second zone for the second virtual space.

6. The method according to claim 1, wherein when the indicated position repetitively enters/leaves between the first and second zones, repetition of downloading of the second space data is reduced.

7. The method according to claim 1, wherein when the indicated position enters the second zone of the first virtual space from the third zone, it is confirmed if the first space data is already held in the second memory.

8. A storage medium storing a computer program that implements the space rendering method cited in claim 1.

9. A space rendering method for rendering a virtual space comprising the steps of:
   storing space data of a plurality of virtual spaces in a first memory;
   rendering a first virtual space at an arbitrary indicated position, which belongs to a first zone, on the basis of first space data, which has been downloaded from the first memory to a second memory different from the first memory;
   holding the first space data in the second memory and downloading space data of a second zone from the first memory to the second memory when the indicated position has moved into the second zone different from the first zone; and
   releasing the first space data held in the second memory when the indicated position stays in the second zone for a first time duration after the indicated position has moved from the first zone to the second zone.

10. A storage medium storing a computer program that implements the space rendering method cited in claim 9.

11. A virtual space rendering apparatus for rendering a virtual space viewed from an arbitrary viewpoint position, comprising:
    a first memory for storing space data of a plurality of virtual spaces;
    a second memory different from said first memory
    means for rendering a first virtual space at an arbitrary viewpoint position, which belongs to a first zone, on the basis of first space data, which has been downloaded from said first memory to said second memory; and
    means for holding the first space data in said second memory and downloading space data of a second zone from said first memory to said second memory when the viewpoint position has moved into the second zone outside the first zone; and
    means for releasing the first space data held in said second memory when the viewpoint position moves into a third zone different from the second zone after the indicated position has moved from the first zone to the second zone.

12. The apparatus according to claim 11, wherein when the viewpoint position has moved from the first zone to the second zone, and then stays in the second zone, a measurement of a staying time in the second zone is started.

13. The apparatus according to claim 11, wherein when the viewpoint position has returned from the second zone to the first zone, the first space data held in said second memory is used as a basis of rendering of the virtual space.

14. The apparatus according to claim 11, further comprising means for making a user input instruction operation, and wherein when the viewpoint position has moved from the first zone to the second zone, and when a user inputs the instruction operation while the viewpoint position stays in the second zone, the first space data held in said second memory is released.

15. The apparatus according to claim 11, wherein the third zone bounds both the second zone of the first virtual space and a second zone for the second virtual space.

16. The apparatus according to claim 11, wherein when the viewpoint position repetitively enters/leaves between the first and second zones, repetition of downloading of the second space data is reduced.

17. The apparatus according to claim 11, wherein when the viewpoint position enters the second zone of the first virtual space from the third zone, it is confirmed if the first space data is already held in said second memory.

18. The apparatus according to claim 11, wherein said second memory is set in a main memory of said rendering apparatus, and said first memory is set as an external memory of said rendering apparatus.

19. A virtual space rendering apparatus for rendering a virtual space viewed from an arbitrary viewpoint position, comprising:

a first memory for storing space data of a plurality of virtual spaces;

a second memory different from said first memory;

means for rendering a first virtual space at an arbitrary viewpoint position, which belongs to a first zone, on the basis of first space data, which has been downloaded from said first memory to said second memory;

means for holding the first space data in said second memory and downloading space data of a second zone from said first memory to said second memory when the viewpoint position has moved into the second zone outside the first zone; and means for releasing the first space data held in said second memory when the viewpoint position held in said second memory stays in the second zone for a first time duration after the viewpoint position has moved from the first zone to the second zone.

20. A space rendering method for rendering a virtual space comprising steps of:

downloading virtual space data corresponding to an indicated position from a first memory storing virtual space data, and then storing the downloaded data in a second memory;

rendering a virtual space corresponding to the indicated position, using the virtual space data stored in the second memory;

holding virtual space data of the first zone when the indicated position has moved from the first zone to a second zone different from the first zone; and releasing the held virtual space data of the first zone when the indicated position has moved from the second zone to a third zone different from the first and second zones.

21. A space rendering method for rendering a virtual space, comprising the steps of:

downloading virtual space data corresponding to an indicated position from a first memory storing virtual space data, and then storing the downloaded data in a second memory;

rendering a virtual space corresponding to the indicated position, using the virtual space data stored in the second memory;

holding virtual space data of a first zone when the indicated position has moved from the first zone to a second zone different from the first zone; and releasing the held virtual space data of the first zone when the indicated position has stayed in the second zone for a first time duration.

* * * * *

UNITED STATES PATENT AND TRADEMARK OFFICE
CERTIFICATE OF CORRECTION

PATENT NO. : 6,825,837 B1
DATED : November 30, 2004
INVENTOR(S) : Sakagawa et al.

It is certified that error appears in the above-identified patent and that said Letters Patent is hereby corrected as shown below:

Title page,
Item [74], *Attorney, Agent, or Firm*, "Fitzpatrick, Cella Harper & Scinto" should read -- Fitzpatrick, Cella, Harper & Scinto --.

Column 3,
Line 4, "room(subspace" should read -- room (subspace --.

Column 6,
Line 9, "space," should read -- space --.

Column 8,
Line 28, "i.e." should read -- i.e., --.
Line 34, "embodiment." should read -- embodiments. --

Column 9,
Line 16, "data" should read -- data, -- and "and," should be deleted.

Column 13,
Line 26, "zone, the" should read -- zone is the --.

Column 16,
Line 24, "(resister" should read -- (register --.
Line 26, "resister" should read -- register --.

Column 19,
Line 6, "zone)." should read -- zone"). --.

Column 22,
Line 17, "memory" should read -- memory; --.
Line 21, "and" should be deleted.

Column 23,
Line 20, "comprising steps" should read -- comprising the steps --.

UNITED STATES PATENT AND TRADEMARK OFFICE
CERTIFICATE OF CORRECTION

PATENT NO.   : 6,825,837 B1
DATED        : November 30, 2004
INVENTOR(S)  : Sakagawa et al.

It is certified that error appears in the above-identified patent and that said Letters Patent is hereby corrected as shown below:

Column 24,
Line 1, "the" (first occurrence) should read -- a --.

Signed and Sealed this

Third Day of May, 2005

JON W. DUDAS
*Director of the United States Patent and Trademark Office*